(12) United States Patent
Neal et al.

(10) Patent No.: US 7,865,437 B2
(45) Date of Patent: Jan. 4, 2011

(54) SYSTEMS AND METHODS FOR PROCESSING BENEFITS

(75) Inventors: Irma Jean Neal, Indianapolis, IN (US); David Schneider, Edmond, OK (US)

(73) Assignee: ACS State & Local Solutions, Inc., Washington, DC (US)

( * ) Notice: Subject to any disclaimer, the term of this patent is extended or adjusted under 35 U.S.C. 154(b) by 0 days.

(21) Appl. No.: 12/826,881

(22) Filed: Jun. 30, 2010

(65) Prior Publication Data

US 2010/0280967 A1 Nov. 4, 2010

Related U.S. Application Data

(62) Division of application No. 10/631,472, filed on Jul. 30, 2003, now Pat. No. 7,774,273.

(60) Provisional application No. 60/399,153, filed on Jul. 30, 2002.

(51) Int. Cl.
    *G06Q 40/00* (2006.01)
    *G06Q 10/00* (2006.01)
(52) U.S. Cl. ............................ 705/39; 705/2
(58) Field of Classification Search .............. 705/39–42
    See application file for complete search history.

(56) References Cited

U.S. PATENT DOCUMENTS

| | | | |
|---|---|---|---|
| 4,341,951 A | 7/1982 | Benton | |
| 5,457,747 A | 10/1995 | Drexler et al. | |
| 5,461,217 A | 10/1995 | Claus | |
| 5,479,510 A | 12/1995 | Olsen et al. | |
| 5,530,855 A | 6/1996 | Satoh et al. | |
| 5,536,045 A | 7/1996 | Adams | |
| 5,559,887 A | 9/1996 | Davis et al. | |

(Continued)

FOREIGN PATENT DOCUMENTS

EP       0088639 A3       9/1983

(Continued)

OTHER PUBLICATIONS

Business and Medical Editors, "Imperial Technology Solutions Signs Product Licensing Agreement with Executive Healthcare Services", Business Wire. New York: Aug. 2, 1999. p. 1.*

(Continued)

*Primary Examiner*—Ella Colbert
*Assistant Examiner*—Mohammad Z Shaikh
(74) *Attorney, Agent, or Firm*—Finnegan, Henderson, Farabow, Garrett & Dunner, L.L.P.

(57) ABSTRACT

Systems and methods for processing, for example, childcare benefits include: issuing a benefit card to a childcare customer; receiving a start time for childcare service at a childcare provider, the start time recorded by using the benefit card at a terminal located at the children provider at the start of childcare service; receiving an end time for childcare services at the childcare provider, the end time recorded by using the benefit card at a terminal located at the childcare provider at the end of childcare services; computing the childcare benefit eligibility based on the start time, the end time and benefits available for the childcare customer; and paying the childcare provider a payment based on the computed benefit eligibility.

32 Claims, 24 Drawing Sheets

U.S. PATENT DOCUMENTS

| | | | |
|---|---|---|---|
| 5,577,121 A | 11/1996 | Davis et al. | |
| 5,640,561 A | 6/1997 | Satoh et al. | |
| 5,737,539 A | 4/1998 | Edelson et al. | |
| 5,864,822 A | 1/1999 | Baker, III | |
| 5,924,094 A | 7/1999 | Sutter | |
| 5,930,759 A * | 7/1999 | Moore et al. | 705/2 |
| 5,953,709 A | 9/1999 | Gilbert et al. | |
| 5,953,719 A | 9/1999 | Kleewein et al. | |
| 5,991,742 A | 11/1999 | Tran | |
| 6,014,635 A | 1/2000 | Harris et al. | |
| 6,061,660 A | 5/2000 | Eggleston et al. | |
| 6,067,522 A | 5/2000 | Warady et al. | |
| 6,094,644 A | 7/2000 | Hillson et al. | |
| 6,112,182 A | 8/2000 | Akers et al. | |
| 6,115,715 A | 9/2000 | Traversat et al. | |
| 6,129,275 A | 10/2000 | Urquhart et al. | |
| 6,169,974 B1 | 1/2001 | Baumgartner et al. | |
| 6,189,011 B1 | 2/2001 | Lim et al. | |
| 6,199,074 B1 | 3/2001 | Kern et al. | |
| 6,230,145 B1 | 5/2001 | Verderamo et al. | |
| 6,233,617 B1 | 5/2001 | Rothwein et al. | |
| 6,266,648 B1 | 7/2001 | Baker, III | |
| 6,282,522 B1 | 8/2001 | Davis et al. | |
| 6,299,062 B1 | 10/2001 | Hwang | |
| 6,324,528 B1 | 11/2001 | Hillson et al. | |
| 6,343,271 B1 * | 1/2002 | Peterson et al. | 705/4 |
| 6,347,739 B1 | 2/2002 | Tamam | |
| 6,401,079 B1 | 6/2002 | Kahn et al. | |
| 6,446,089 B1 | 9/2002 | Brodersen et al. | |
| 6,446,092 B1 | 9/2002 | Sutter | |
| 6,615,190 B1 | 9/2003 | Slater | |
| 6,616,189 B2 | 9/2003 | Raming | |
| 6,694,447 B1 | 2/2004 | Leach et al. | |
| 6,766,302 B2 | 7/2004 | Bach | |
| 6,808,111 B2 | 10/2004 | Kashef et al. | |
| 6,873,995 B2 | 3/2005 | Benson et al. | |
| 6,896,618 B2 | 5/2005 | Benoy et al. | |
| 6,915,265 B1 * | 7/2005 | Johnson | 705/2 |
| 6,915,266 B1 * | 7/2005 | Saeed et al. | 705/2 |
| 6,999,936 B2 | 2/2006 | Sehr | |
| 7,039,593 B2 * | 5/2006 | Sager | 705/4 |
| 7,054,838 B2 | 5/2006 | Sutton et al. | |
| 7,072,842 B2 * | 7/2006 | Provost et al. | 705/4 |
| 7,083,084 B2 | 8/2006 | Graves et al. | |
| 7,136,835 B1 | 11/2006 | Flitcroft et al. | |
| 7,149,724 B1 | 12/2006 | Flanagan et al. | |
| 7,165,049 B2 | 1/2007 | Slater | |
| 7,174,315 B2 | 2/2007 | Phillips et al. | |
| 7,206,805 B1 | 4/2007 | McLaughlin, Jr. | |
| 7,222,097 B2 | 5/2007 | Bellosguardo | |
| 7,290,056 B1 | 10/2007 | McLaughlin, Jr. | |
| 7,319,986 B2 | 1/2008 | Praisner et al. | |
| 7,774,273 B2 * | 8/2010 | Neal et al. | 705/39 |
| 2001/0034702 A1 | 10/2001 | Mockett et al. | |
| 2001/0047286 A1 * | 11/2001 | Walker et al. | 705/9 |
| 2001/0049638 A1 | 12/2001 | Satoh | |
| 2002/0010679 A1 | 1/2002 | Felsher | |
| 2002/0026329 A1 | 2/2002 | Saito et al. | |
| 2002/0091549 A1 * | 7/2002 | Provost et al. | 705/4 |
| 2002/0091635 A1 | 7/2002 | Dilip et al. | |
| 2002/0107849 A1 | 8/2002 | Hickey et al. | |
| 2002/0156676 A1 | 10/2002 | Ahrens et al. | |
| 2003/0009355 A1 | 1/2003 | Gupta | |
| 2003/0069760 A1 * | 4/2003 | Gelber | 705/4 |
| 2003/0074234 A1 | 4/2003 | Stasny | |
| 2003/0083903 A1 * | 5/2003 | Myers | 705/2 |
| 2003/0093283 A1 | 5/2003 | Morsa | |
| 2003/0101136 A1 | 5/2003 | Wheeler et al. | |
| 2003/0163755 A1 | 8/2003 | Fung et al. | |
| 2003/0177150 A1 | 9/2003 | Fung et al. | |
| 2003/0191669 A1 * | 10/2003 | Fitzgerald et al. | 705/2 |
| 2003/0216967 A1 | 11/2003 | Williams | |
| 2003/0225760 A1 | 12/2003 | Ruuth et al. | |
| 2004/0006489 A1 * | 1/2004 | Bynon | 705/2 |
| 2004/0083173 A1 | 4/2004 | Reddihough et al. | |
| 2004/0093303 A1 | 5/2004 | Picciallo | |
| 2004/0128245 A1 | 7/2004 | Neal et al. | |
| 2005/0125320 A1 | 6/2005 | Boesen | |
| 2006/0116960 A1 | 6/2006 | Gillin et al. | |
| 2006/0218206 A1 | 9/2006 | Bourbonnais et al. | |
| 2007/0061251 A1 | 3/2007 | Watkins | |
| 2007/0094047 A1 | 4/2007 | Sager | |

FOREIGN PATENT DOCUMENTS

| | | |
|---|---|---|
| EP | 0216521 B1 | 11/1993 |
| EP | 0493894 B1 | 3/1996 |
| GB | 2323060 | 9/1998 |
| JP | 06-032086 | 2/1994 |
| WO | WO 96/25814 | 8/1996 |
| WO | WO 96/41287 | 12/1996 |
| WO | WO 97/10560 | 3/1997 |
| WO | WO 97/17212 | 5/1997 |
| WO | WO 97/30409 | 8/1997 |
| WO | WO 97/39424 | 10/1997 |
| WO | WO 97/41541 | 11/1997 |
| WO | WO 98/05011 | 2/1998 |
| WO | WO 99/06967 | 2/1999 |
| WO | WO 01/29708 | 4/2001 |

OTHER PUBLICATIONS

Anonymous, "Future Medicare, Medicaid claims may be filed by card", Card News. Potomac: Nov. 12, 1992. vol. 7, Iss:21; p. 1.*

"Neighborhood Health Partnership and Perot Systems Launch Web-Based Solutions for Providers", PR Newswire. New York: Apr. 12, 2000. p. 1.*

Business Editors/ High Tech Writers, "Sweden's Nationalised Pharmacy, Apoteket, Selects Hypercom Solutions; POS Equipment establishing itself in Healthcare Industry", Business Wire. New York: Feb. 20, 2001. p. 1.*

"Health insurance associations will be allowed to directly audit", Asahi Evening News. Tokyo: Apr. 16, 2002. p. 1.*

"More hospitals joining new emergency card network", Business World (Philippines), Aug. 16, 2001, p. 21.*

Odea, Clare, "Childcare voucher scheme brings many benefits", Irish Times. Dublin: Apr. 19, 2002. p. 62.*

Resch, Inka, "Medical Care on a Card; Can a European import fix what ails America?", Business Week, New York: Sep. 14, 1998., Iss. 3595; p. 94.*

O'Hara, Colleen; Jones, Jennifer, "Feds, states pilot smart health cards", Federal Computer Week. Falls Church: May 17, 1999. vol. 13, Iss. 15; p. 1, 2 pgs.*

Anonymous, "Another stab at private-label healthcare card programs", Credit Card News. Chicago: Oct. 1, 2000. p. 7, 1 pgs.*

Norton, Cherry, "Working mothers total has doubled in past 10 years Welfare Childcare vouchers lead to a sharp rise in the nnumbers of women with children under five returning to work", The Indpendent. London (UK): Oct. 20, 1999. p. 12.*

"Supporting HIPPA Compliance and Streamlining Workflow: HDX Forms Agreement with IDX to Provide-All Payer Solution", Business Wire, Jul. 11, 2001.*

"A New Card Dispenser Gives the Unbanked a Debit Option," Debit Card News, Apr. 27, 1998 (2 pages).

"American Express: Last Minute Shoppers Face Grim Reality," M2 Presswire, Dec. 17, 1999 (1 page).

"An AmEx Stored-Value Quest Leads To a Disney Debit Card Pact," The Gale Group, Jun. 25, 1998 (3 pages).

"Another stab at private-label healthcare card programs", Credit Card News. Chicago: Oct. 1, 2000, p. 7 (1 page).

A CBO Study, Emerging Electronic Methods for Making Retail Payments, The Congress of the United States, Congressional Budget Office, U.S. GPO, Jun. 1996 (62 pages).

"Business Plan," WallyCard.com, pp. 1-14 (retrieved from http://leeds-faculty.colorado.edu/ moyes/bplan/Samples/WallyCard/WallyCard.pdf on Sep. 8, 2008) (14 pages).

Bell, Stephen, "Direct Electronic Cash—Coming Soon to a Store Near You," Independent Business Weekly, May 20, 1998, New Zealand (4 pages).

Bellare, M., "VarietyCash: A Multi-purpose Electronic Payment System," Proceedings of the 3rd USENIX Workshop on Electronic Commerce, Aug. 31-Sep. 3, 1998, pp. 9-24 (18 pages).

Block, Valerie, "Belgians Promoting Their Smart Card in U.S. (Banksys)," American Banker, vol. 160, No. 156, Aug. 15, 1995 (2 pages).

Bowen, Cathy, "Welfare Agencies Seek Benefits From Chip Cards," Card Technology, V7, N1, pp. 40-44, Jan. 2002 (5 page print-out from Dialog®).

Burger, Andrew, "Hong Kong: Smart Card Hotbed," The Gale Group, Jul. 1998 (7 pages).

Burmansson, Frank, "Travel Cards in the Year 2000: The Helsinki Region Ushers in the Smart Card Era," Urban Public Transportation Systems, Proceedings of the First International Conference, Committee on Public Transport, Urban Transportation Division, ASCE, Mar. 21-25, 1999, pp. 229-239 (10 pages).

Business and Finance, "Creating the Digital Citizen," May 10, 2001 (2 page print-out from Dialog®).

Business Wire, Broadbase Software, BoradVision, Interwoven and Verify Create State-of-the-Art Portal for the State of California (Sacramento, CA), Jan. 9, 2001 (5 page print-out from FindArticles.com).

"Childcare voucher scheme brings many benefits", Clare Odea. Irish Times. Dublin: Apr. 19, 2002 (3 pages).

"Claimant Guide," Utah Department of Workforce Services Unemployment Insurance, pp. 1-20 (retrieved from http://jobs.utah.gov/ui/jobseeker/claimguide.asp on Sep. 8, 2008) (20 pages).

Dib, Joulia, et al., "Electronic Benefit Transfer (EBT) Programs: Best Practices To Serve Recipients," Goldman School of Public Policy, University of California at Berkeley, Aug. 2000, pp. i-v and 1-93.

"EMV Migration Economics—Comparing Native and MULTOS smart card choices," MULTOS, pp. 1-17 (retrieved from www.multos.com/downloads/Whitepaper_EMV_Migration_Economics_Platform_Comparison.pdf on Sep. 8, 2008) (17 pages).

"EMV: The Journey From Mag-Stripe to Chip Cards," Secure Payment (retrieved from http://www.silicon-trust.com/trends/tr_emv.html on Sep. 8, 2008) (5 pages).

Electronic Benefit Transfer—History, EBT History Page, Texas Health and Human Services Commission, (retrieved from www.hhsc.state.tx.us/providers/LoneStar/EBT/EBThistory.html on Sep. 4, 2008) (5 pages).

Excerpt from International Search Report PCT/US03/29982, dated Jun. 21, 2004, indicating "Documents Considered to be Relevant" (1 page).

"Feds, states pilot smart health cards", Collen O'Hara, Jennifer Jones. Federal Computer Week. Falls Church: May 17, 1999, vol. 13, Iss. 15 (3 pages).

Gregg, Leigh, "Will You Be Ready for E-Cash?," Credit Union Executive Journal, vol. 38, Iss. 1, Jan./Feb. 1998, p. 12 (4 pages).

"Hypercom Partners with ACS to Deploy 15,000 ePic ICE 5500 Card Payment Terminals in Support of Texas EBT System," Business Wire, Jun. 13, 2000 (retrieved from http://findarticles.com/p/articles/mi_m0EIN/is_2000_June_13/ai_62696512 on Sep. 8, 2008)(3 pages).

Hancock, Diana et al., "Payment transactions, instruments, and systems: A survey," Journal of Banking & Finance 21 (1998) pp. 1573-1624 (52 pages).

Hansell, Saul, "Mastercard's 'Smart Card' Builds Support," The New York Times, Late Edition—Final, p. 3, col. 1, Dec. 5, 1996 (2 pages).

Hargreaves, Margaret et al., "The Evaluation of the Expanded EBT Demonstration in Maryland, vol. 1: System Startup, Conversion and Expansion," May 1994 (retrieved from www.abtassociates.com/reports/D19940002.pdf on Sep. 8, 2008) (150 pages).

Interview Summary, dated Mar. 7, 2008, for U.S. Appl. No. 10/379,733, filed Mar. 6, 2003 (2 pages).

Jaben, Jan, "Finland Sprints Ahead with Smart Cards," Credit Collection News, Nov. 6, 1997 (4 pages).

King, Julia, "Teen Buyers Now Have New Ways To Pay Online," Computerworld, 33, 43, ABI/Inform Global, Oct. 25, 1999, p. 40 (1 page).

Kline, Alan, "Calif. Bank Buys Control Of Electronic Paycheck Firm Series: 9," American Banker, vol. 162, Iss. 204, p. 8, Oct. 22, 1997, New York, NY (2 pages).

"Medical Care on a Card; Can a European import fix what ails America?", Inka Resch. Business Week. New York, Sep. 14, 1998, Iss. 3595 (3 pages).

Magid, Larry, "Credit Cards, Internet team up to give kids lessons in how to manage spending," The Mercury News, Family Tech (retrieved from http://www.larrysworld.com/articles/sjm_credicards.htm on Sep. 8, 2008) (3 pages).

McDonald, Noreen, "Multipurpose Smart Cards in Transportation: Benefits and Barriers to Use," Dec. 8, 2000, pp. 1-27 (retrieved from www.uctc.net/scripts/countdown.pl?630.pdf on Sep. 8, 2008) (27 pages).

McGee, John, "Towards a Cashless Society," Business and Finance, Business and Finance Magazine, Nov. 27, 1997 (2 pages).

Notice of Allowance and Fees Due, dated Apr. 28, 2010, for U.S. Appl. No. 10/631,472, filed Jul. 30, 2003 (26 pages).

Notice of Allowance and Fees Due, dated Apr. 3, 2009, for U.S. Appl. No. 10/650,994, filed Aug. 29, 2003 (12 pages).

Notice of Allowance and Fees Due, dated Oct. 7, 2008, for U.S. Appl. No. 10/650,994, filed Aug. 29, 2003 (19 pages).

Notice of Panel Decision from Pre-Appeal Brief Review, dated Feb. 4, 2009, for U.S. Appl. No. 10/379,733, filed Mar. 6, 2003 2 pages).

Notice of Panel Decision from Pre-Appeal Brief Review, dated May 19, 2010, for U.S. Appl. No. 10/379,733, filed Mar. 6, 2003 (2 pages).

Notice of Panel Decision from Pre-Appeal Brief Review, dated Sep. 13, 2007, for U.S. Appl. No. 10/379,733, filed Mar. 6, 2003 (2 pages).

Office Action, dated Apr. 2, 2008, for U.S. Appl. No. 10/650,994, filed Aug. 29, 2003 (23 pages).

Office Action, dated Apr. 27, 2009, for U.S. Appl. No. 10/379,733, filed Mar. 6, 2003 (11 pages).

Office Action, dated Apr. 28, 2005, for U.S. Appl. No. 10/379,733, filed Mar. 6, 2003 (12 pages).

Office Action, dated Aug. 28, 2006, for U.S. Appl. No. 10/379,733, filed Mar. 6, 2003 (10 pages).

Office Action, dated Dec. 13, 2007, for U.S. Appl. No. 10/379,733, filed Mar. 6, 2003 (12 pages).

Office Action, dated Dec. 4, 2007, for U.S. Appl. No. 10/631,472, filed Jul. 30, 2003 (77 pages).

Office Action, dated Feb. 18, 2010, for U.S. Appl. No. 10/379,733, filed Mar. 6, 2003 (11 pages).

Office Action, dated Feb. 20, 2009, for U.S. Appl. No. 10/631,472, filed Jul. 30, 2003 (23 pages).

Office Action, dated Jan. 18, 2007, for U.S. Appl. No. 10/379,733, filed Mar. 6, 2003 (12 pages).

Office Action, dated Jan. 6, 2009, for U.S. Appl. No. 10/631,472, filed Jul. 30, 2003 (24 pages).

Office Action, dated Jul. 22, 2009, for U.S. Appl. No. 10/379,733, filed Mar. 6, 2003 (10 pages).

Office Action, dated Jul. 9, 2008, for U.S. Appl. No. 10/631,472, filed Jul. 30, 2003 (65 pages).

Office Action, dated Mar. 15, 2005, for U.S. Appl. No. 10/379,733, filed Mar. 6, 2003 (5 pages).

Office Action, dated Mar. 17, 2006, for U.S. Appl. No. 10/379,733, filed Mar. 6, 2003 (11 pages).

Office Action, dated Mar. 21, 2008, for U.S. Appl. No. 10/379,733, filed Mar. 6, 2003 (12 pages).

Office Action, dated May 21, 2007, for U.S. Appl. No. 10/379,733, filed Mar. 6, 2003 (12 pages).

Office Action, dated Oct. 1, 2008, for U.S. Appl. No. 10/379,733, filed Mar. 6, 2003 (12 pages).

Office Action, dated Oct. 16, 2009, for U.S. Appl. No. 10/631,472, filed Jul. 30, 2003 (23 pages).

Office Action, dated Sep. 20, 2005, for U.S. Appl. No. 10/379,733, filed Mar. 6, 2003 (11 pages).

Oliveira, Victor et al., "All Food Stamp Benefits To Be Issued Electronically," Food Assistance and Welfare Reform, Jan.-Apr. 1998, pp. 35-39 (5 pages).

"PocketCard Inc.'s Product Launch at Internet World Summer 99; High-Tech VISA Card Ends Expense Account Headaches," Business Wire, Jul. 21, 1999 (retrieved from http://findarticles.com/p/articles/mi_m0EIN/is_1999_July_21/ai_55217741 on Sep. 8, 2008) (4 pages).

"Pocketcard Visa, A new twist on teaching teens about credit," Epinions.com, Jun. 11, 2000 (retrieved from www99.epinions.com/finc-review-2C14-9FACA4F-39447D2B-prod5 on Sep. 8, 2008) (2 pages).

"PocketCard," CardWeb.com, Jul. 22, 1999 (retrieved from www.cardweb.com/cardtrak/news/1999/july/22a.html on Sep. 8, 2008) (1 page).

"Prepaid Cards," Working Group on EU Payment Systems, May 1994, republished on Dec. 21, 1997 (retrieved from http://jya.com/EU_prepaid_cards.html on Sep. 8, 2008) (11 pages).

"Prepay? It's in the Cards," The Gale Group, Apr. 1994 (3 pages).

Parker, "Visa International Charges Ahead With Stored-Value Card," InfoWorld, vol. 17, No. 42, p. 78, Oct. 16, 1995 (4 pages).

PCT/US03/09931 Search Report dated Jan. 2, 2004 (8 pages).

"Report to the Congress on the Application of the Electronic Fund Transfer Act to Electronic Stored-Value Products," Board of Governors of the Federal Reserve System, Federal Research Board Publications, Mar. 1997, pp. 19-27 (13 pages).

"Security of Electronic Money," Committee on Payment and Settlement Systems and the Group of Computer Experts of the Central Banks of the Group of Ten Countries, Bank for International Settlements (Aug. 1996) (70 pages).

"Smart Cards Finally Get Respect From U.S. Banks," Bank Network News, vol. 12, Iss. 7, p. 1, Aug. 26, 1993, Chicago (3 pages).

"Stored Value Card Systems," Information for Bankers and Examiners, Bulletin to Chief Executive Officers of all National Banks, Department and Division Head, and all Examining Personnel, OCC 96-48, Sep. 10, 1996 (retrieved from www.occ.treas.gov/ftp/bulletin/96-48.txt on Sep. 8, 2008) (10 pages).

"Stored Value Cards: An Alternative for the Unbanked?," Federal Reserve Bank of New York, Jul. 2004 (retrieved from www.ny.frb.org/regional/stored_value_cards.html on Sep. 8, 2008) (5 pages).

Sanders, Bob, "New Electronic Systems Let Your Fingers Do the Banking," New Hampshire Business Review (Manchester, NH), V18, N7, p. 1 (dated Mar. 29, 1996) (5 page print-out from Dialog®).

"Telephone Card Guide," KARS Unlimited (retrieved from www.kars-unlimited.com/svc_guide.htm on Sep. 8, 2008) (1 page).

Texas' EBT System, The Lone Star Card, The Texas Lone Star Card, Electronic Benefits Transfer and Public Policy, (retrieved from www.utexas.edu/lbj/21cp/ebt/lonestar.htm on Sep. 4, 2008) (1 page).

Tual, Jean Pierre et al., "Electronic Commerce, Electronic Purse and Standardisation," MUST 97 (retrieved from www.jptual.club.fr/downloads/must197 on Sep. 8, 2008) (29 pages).

Turner, Nigel, "Bank Launches Salary Card," Smart Card News, Smart Card News Ltd., Brighton, England, vol. 8, No. 4, p. 71, Apr. 1999 (20 pages).

USDA (US Department of Agriculture), www.fns.usda.gov, obtained from Internet Archive Wayback Machine www.archive.org, Date Range: Aug. 3, 2002-Aug. 24, 2002. "Facts about the Food Stamp Program" (9 pages).

"Visa Introduces a Prepaid International Money Card," American Banker, Dec. 7, 1994 (3 pages).

"Visa Latin American and Caribbean—The History of Visa," (retrieved from http://www.visalatam.com/e_aboutvisa/acerca_historia.jsp on Sep. 8, 2008) (1 page).

"Working mothers total has doubled in past 20 years WELCARE Childcare vouchers lead to a sharp rise in the numbers of women with children under five returning to work", Cherry Norton. The Independent. London (UK): Oct. 20, 1999 (2 pages).

Wenninger, John et al., "The Electronic Purse," Federal Reserve Bank of New York, Current Issues in Economics and Finance, vol. 1, No. 1, Apr. 1995 (6 pages).

* cited by examiner

BENEFIT CARD eChildcare Solutions     Information Management

| | | | |
|---|---|---|---|
| Current Information | First | JOHN | MI K |
| Case Worker Info | Last | SMITH | SUFF JR |
| Jane Doe | | | |
| Account | Address 1 | 1004 MARYLAND ST | |
| Main Menu | Address 2 | | |
| | City | Tulsa | |
| | State | OK ▽ | Zip 338804 |
| | Gender | ● Male ○ Female | SSN 123456789 |
| | DPB | 1986/08/15 | |
| | Number of Children in household | 1 | |

— 1010

Microsoft Internet Explorer
? Proceed with creation of recipient?
OK    Cancel

FIG. 10B eChildcare Solutions     Recipient Card Management

Current Information

Case Worker Info: Jane Doe

Account

Main Menu

Issue New Card

| PAN | Type | Status | Issue Date | Expire Date | Freeze Date |
|---|---|---|---|---|---|
| 3855764490219838712 | REGULAR | ISSUED | 2001/09/05 | 2003/09/05 | 2003/09/05 |

Bad Pin Information

| Bad Pin Count | 0 | Bad Pin Date | |
|---|---|---|---|

Replace card     1030     Change Plan

Reason: LOST
New Pan: 9812345834580133234
New Expire Date: 2003/09/05
Replace

Microsoft Internet Explorer

? Proceed with card replacement?

OK     Cancel

Cases

| Cases with Primary Access | | | | | |
|---|---|---|---|---|---|
| Case Nbr | Program | Case Type | Case Status | Last Issued | Balance |
| 982020333 | CHILD CARE | REGULAR | OPEN | | 0.0 |

Cards List

FIG. 10D

Payment Report
Date Generated: 5 April 2001

Provider: Sherrie's Day Care
Facility: Oak Street
Contract Number: 12345

Authorized EBT Children

| Child | Case | Person # | Auth FT | Auth PT |
|---|---|---|---|---|
| Adams, D. | 98723 | 1 | 23 | 5 |
| Long, C. | 23763 | 1 | 15 | 0 |
| Martin, A. | 52368 | 1 | 23 | 5 |

Payment Period: Wednesday March 7 through Tuesday, March 13

| Date | Child | Attendance | DHS Rate | Co-Pay Due | |
|---|---|---|---|---|---|
| 14 | Adams, D. | FT | $15.00 | $0.00 | |
| | Long, C. | FT | $0.00 | $15.00 | |
| | | | *$15.00* | *$15.00* | *Daily Sub* |
| 15 | Adams, D. | FT | $15.00 | $0.00 | |
| | Long, C. | FT | $0.00 | $15.00 | |
| | Martin, A. | FT | $15.00 | $0.00 | |
| | | | *$30.00* | *$15.00* | *Daily Sub* |
| 16 | Adams, D. | PT | $10.00 | $0.00 | |
| | Long, C. | FT | $15.00 | $0.00 | |
| | Martin, A. | FT | $15.00 | $0.00 | |
| | | | *$40.00* | *$0.00* | *Daily Sub* |
| 17 | Long, C. | FT | $15.00 | $0.00 | |
| | Martin, A. | FT | $15.00 | $0.00 | |
| | | | *$30.00* | *$0.00* | *Daily Sub* |
| 18 | Adams, D. | FT | $15.00 | $0.00 | |
| | Long, C. | FT | $15.00 | $0.00 | |
| | Martin, A. | FT | $15.00 | $0.00 | |
| | | | *$45.00* | *$0.00* | *Daily Sub* |
| 19 | Long, C. | FT | $15.00 | $0.00 | |
| | Martin, A. | FT | $15.00 | $0.00 | |
| | | | *$30.00* | *$0.00* | *Daily Sub* |
| 20 | Adams, D. | FT | $10.00 | $0.00 | |
| | Long, C. | FT | $15.00 | $0.00 | |
| | Martin, A. | PT | $15.00 | $0.00 | |
| | | | *$40.00* | *$0.00* | *Daily Sub* |
| | | | $230.00 | $30.00 | Payment |

Data Activity

Month: March 2001  Negative Action Deadline: March 19

County Comanche

Client Message Changes
Total Changes 346

| | Adds | Updates |
|---|---|---|
| On-line | 150 | 196 |
| Batch | 0 | 0 |
| Rejected | 10 | 5 |

Authorization Message Changes
Total Changes 982

| | Adds | Updates |
|---|---|---|
| On-line | 242 | 140 |
| Batch | 0 | 600 |
| Rejected | 0 | 0 |

FIG. 12B

SYSTEMS AND METHODS FOR PROCESSING BENEFITS

This application is a divisional application of application Ser. No. 10/631,472, filed Jul. 30, 2003, now U.S. Pat. No. 7,774,273 which claims priority under 35 U.S.C. §119 based on U.S. Provisional Application No. 60/399,153 filed Jul. 30, 2002, all of which are incorporated herein by reference.

TECHNICAL FIELD

This invention is related to information management, and more particularly to systems and methods for managing payments, budgeting accounts, and reporting finances of services such as childcare services.

DISCUSSION OF RELATED ART

Federal and state governments are responsible for protecting the welfare of its citizens. As a consequence, programs have been established that offer financial assistance or benefits to those citizens whose income meets or falls below the poverty line. In implementing these programs, some state governments provide subsidies or grants for services such as childcare services. Over time, however, at least one study has uncovered rampant fraud and abuse in the areas of record keeping and billing among a number of childcare providers. Moreover, this study indicated that a more efficient means of tracking and monitoring the records of all children receiving government sponsored childcare is needed. Still further, this study showed that state sponsored childcare programs lack a sufficient number of qualified childcare providers, and that the retention rate of qualified childcare providers needs improvement.

Many such problems in the childcare systems result from the sheer amount of time and energy required by the childcare system participants (e.g., administrators, service providers, and funding agencies) in dealing with massive amounts of paperwork involved in tracking childcare providers, determining eligibility of children for care, and maintaining and processing attendance records in a timely manner. Further, these complex processes not only result in waste and frustration for participants, but also provide ample opportunities for fraud.

In light of the aforementioned problems encountered by existing government sponsored childcare services there is a need to provide an efficient systems and methods for managing service providing systems such as childcare providing systems.

SUMMARY

Methods and systems of the present invention enable benefits administrators and service providers to meet financial and record management obligations in an efficient and timely manner.

Consistent with the invention, some embodiments of the invention provide a method for processing benefit payments to service providers. The method for processing childcare benefit payments comprises the steps of issuing a benefit token with a unique machine-readable identifier to a customer; reading the identifier from the benefit token at a terminal located at the provider at the beginning of a service session to generate a start time; reading the identifier from the benefit token at the terminal at the end of the service session to generate an end time; transmitting a transaction record including the start time and the end time to a processing system; computing benefit payment based on the start time, the end time, and an eligibility criteria; and transmitting the benefit payment to the services provider. In some embodiments, the services provider may be a provider of childcare services. In some embodiments, computing the benefit payment may also be based on specific business rules.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE DRAWINGS

In the drawings:

FIG. 10B shows a diagram illustrating an exemplary screen related to childcare customer information management consistent with methods and systems of the present invention;

FIG. 10D shows a diagrams illustrating an exemplary screen related to replacement of a benefit card consistent with methods and systems of the present invention;

FIGS. 12A and 12B illustrate exemplary reports consistent with methods and system of the present invention;

DESCRIPTION OF THE EMBODIMENTS

Figure 1:
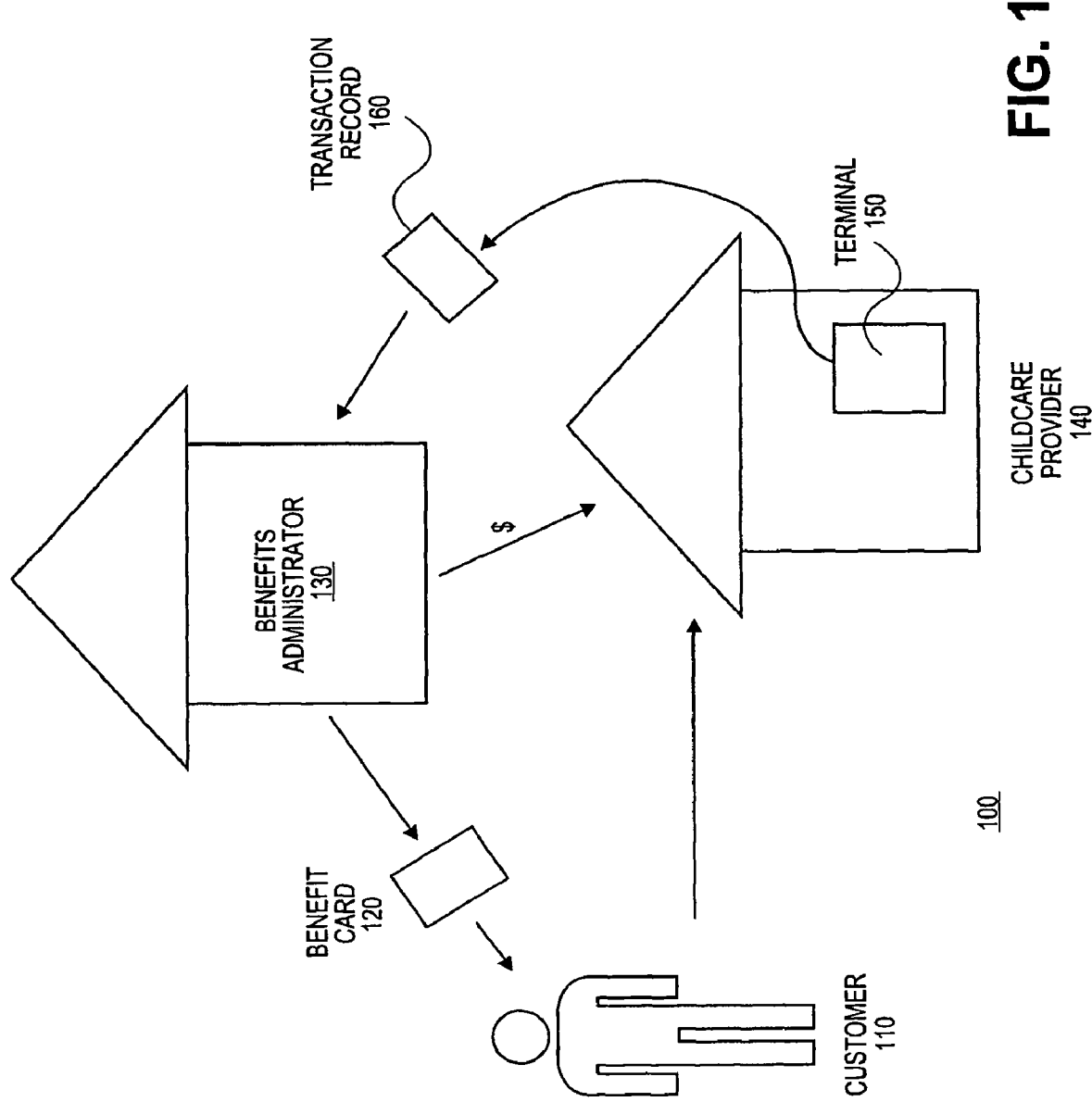
FIG. 1 shows a block diagram illustrating an overview of a childcare processing system consistent with methods and systems of the present invention.

Reference will now be made in detail to the exemplary embodiments consistent with the invention, examples of which are illustrated in the accompanying drawings. Wherever possible, the same reference numbers will be used throughout the drawings to refer to the same or like parts. The childcare processing system disclosed below is an example of a benefits processing system. The examples disclosed herein illustrate some embodiments of the present invention and are not intended to limit applicability of the invention to other benefits programs.

The disclosed benefits processing system is a distributed architecture-based electronic childcare processing system. Accordingly, it may be implemented using object-oriented programming techniques, such as JAVA, distributed databases, and an Internet browser-based front-end. Several users, including federal staff, state staff, county staff, childcare providers, administrators, and childcare customers may interact with the childcare processing system without having specialized software on their computers. Childcare providers and customers may communicate with the system using telephones and/or terminals, for example, which may be located at the childcare providers' site.

Overview

Methods and systems according to the present invention are directed to better management of childcare benefits and records from the childcare customer to a childcare benefits administrator. The customer may be a benefits recipient in need of childcare and eligible for federal, state, or local support, such as payment for childcare services.

Initially, the customer applies for a transaction token in the form of, for example, a benefit card. In order to receive the benefit card, the customer provides personal information to the benefits administrator, including information regarding employment, education, training, and other requested details. The customer then receives a benefit card, having a unique machine-readable identifier, that tracks the customer's use of childcare and provides for benefits, such as partial payment of childcare fees, based on customer eligibility.

A benefit card is associated with each customer and may store information about the customer relating to entitlement to benefits. The benefit card may also be linked to a credit card or deposit account, from which payment of additional fees associated with childcare not covered by the benefits provided to that customer may be drawn.

A terminal, typically located at an approved childcare provider site, provides an interface between the benefits provided, the childcare provider, and the customer through the benefit card. The customer swipes the benefit card through the terminal at the beginning and end of each childcare provider session. The terminal may also include an entry pad for entry of codes or additional data. The terminal creates a transaction record of the use of childcare. The terminal may also facilitate a payment transaction, such as a co-payment associated with the childcare or an overtime payment. The combination of the terminal and the benefit card allow for the easy tracking of attendance at a childcare provider. The transaction record stores information, including customer information, date, location, start time for care, end time for care, and other relevant transaction information. A transaction record may include one transaction or many transactions for one child, one customer, or one location.

The terminal is connected through a network to a childcare processing system, which receives transaction records from a plurality of terminals. The transaction records may be transmitted to the childcare processing system at regular intervals, such as daily, weekly, or monthly. In particular, the childcare processing system processes benefits payments based on the transaction records. The benefits payments are calculated using time and attendance data of customers at the childcare provider. The benefits payments may also factor in specific state or federal childcare rules applicable to a particular customer. The childcare processing system may be used by the benefits administrator to generate payments to childcare providers or customers. The childcare processing system may also be operated by a third party that also transmits invoices for benefits amounts for childcare service to the benefits administrator.

Through receipt of transaction records, the childcare processing system may also generate a number of reports. The reports may include case management reports, individual childcare use reports, audit reports, overall use tracking reports, and other types of reports that may be generated using data from the transaction records. The reports may be viewed by the customer, childcare provider, or benefits administrator in paper form or using the Internet. Though the use of electronic tracking, the childcare processing system can provide for the efficient management of childcare benefits.

FIG. 1 provides an overview of the general structure of a childcare processing environment 100. Childcare processing environment 100 includes a customer 110, a benefit card 120, a benefits administrator 130, a childcare provider 140, a terminal 150, and a transaction record 160.

Customer 110 is a benefits recipient who is eligible for childcare benefits for one or more children. Benefit card 120 is a card issued by benefits administrator 130 to customer 110 for use in the childcare processing environment 100. Benefit card 120 stores information about customer 110. Benefits administrator 130 may be the federal, state, county, or private group that sponsors childcare benefits for eligible participants.

Childcare provider 140 provides one or more services to qualified customers 110. Several childcare providers 140, for example, may be located in the same building, but typically they would at least occupy different rooms. Each childcare provider 140 may be managed by one or more different economic entities, or some or all of childcare providers 140 may be managed by the same economic entity. In fact, a different individual may manage each childcare provider 140. Examples of services that may be provided by one or more of childcare providers 140 include day care, medical, counseling, or other services associated with children.

The site of childcare provider 140 includes a terminal 150, which connects childcare provider 140 with a childcare processing system 200 to facilitate execution of client transactions and calculation of payment data based on those transactions over a predefined period of time. Client transactions can, for example, include recording beginning and ending times for the duration of services, validating client identity, and verifying eligibility for the services requested. Childcare provider 140 further stores and outputs the respective financial data and transaction information as a transaction record 160, which can be transferred to a childcare processing system 200.

Figure 2:
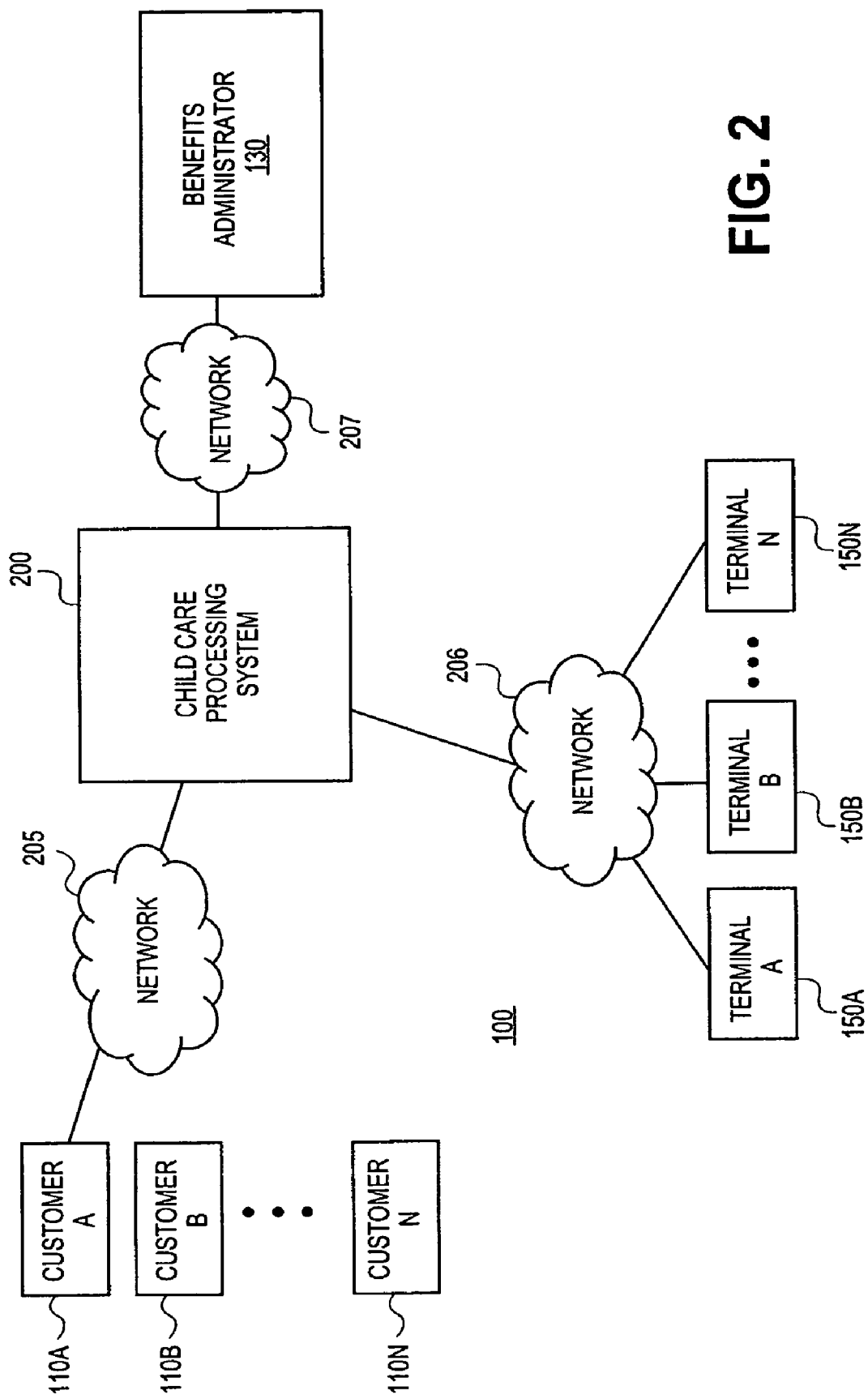
FIG. 2 shows an exemplary childcare processing environment consistent with methods and systems of the present invention.

FIG. 2 illustrates an embodiment of childcare processing environment 100 with a childcare processing system 200 consistent with methods and systems of the present invention. Childcare processing system 200 may be an Electronic Payment Processing and Information Control ("EPPIC") system, connected via a network 205 to customers $110_{A-N}$. Any number of customers $110_{A-N}$ may be connected to childcare processing system 200 through network 205. Childcare processing system 200 is further connected, via a network 206, to terminals $150_{A-N}$. Each of terminals $150_{A-N}$ is located at a corresponding childcare provider $140_{A-N}$. Childcare processing system 200 is further connected, via network 207 to benefits administrator 130. Benefits administrator 130 may include connections to federal, state, and county providers (not shown). Although only a limited number of participants are depicted in FIG. 2, additional participants, such as third party processors, federal, state, and county offices may be connected to childcare processing system 200 through various networking environments.

Networks 205, 206 and 207 may be any appropriate mechanism permitting communication among the various components. Examples of networks 205, 206 and 207 include the Internet, telephony networks, private networks, virtual private networks, local area networks, metropolitan area networks, wide area networks, ad hoc networks, state networks, frame-relay networks, or any other mechanism for permitting communication between remote sites, regardless of whether the connection is wired or wireless. Thus, the present invention can be used in any environment where information may be exchanged by any means among the various components childcare processing environment 100.

Benefit Card

Figure 3:
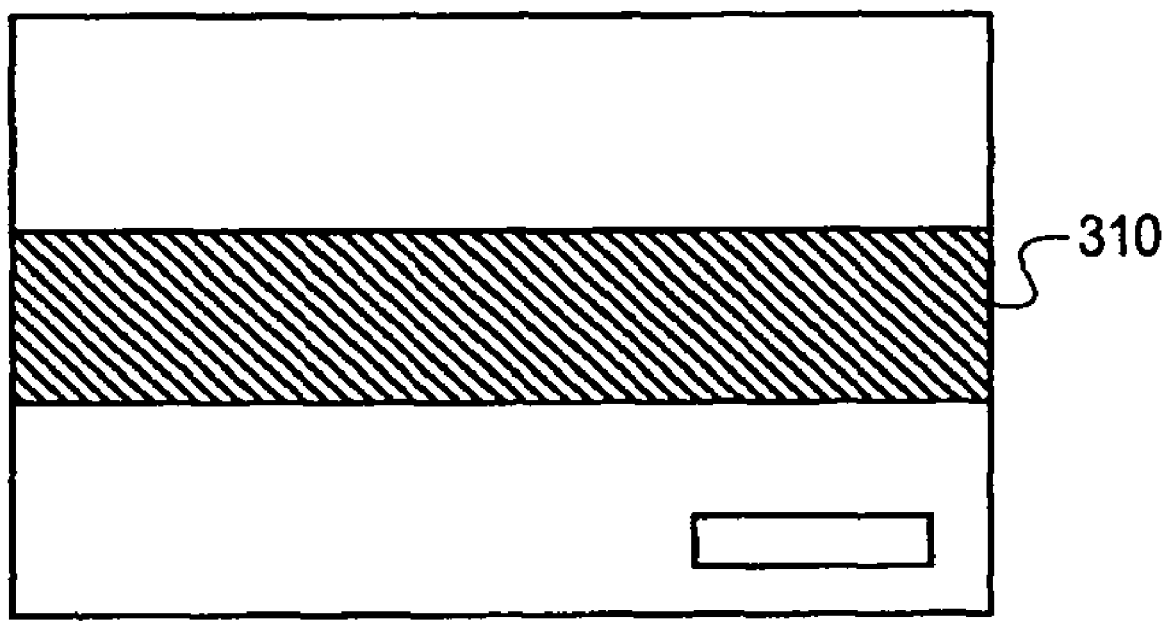
FIG. 3 shows a diagram illustrating a benefit card consistent with methods and systems of the present invention.

FIG. 3 shows a diagram illustrating transaction token 120 consistent with methods and systems of the present invention. Token 120 may be in the form of a plastic card with a magnetized strip of information, a smart card, an RF transponder, or any other device that may be used for machine readable retrieval and storage of benefits information.

Each prospective customer 110 completes an application to determine whether they qualify for childcare benefits. Once customer 110 completes the application process, an administrative institution through benefits administrator 130 authorizes or denies the client participation in the childcare program. If benefits administrator 130 authorizes customer 110 to receive subsidized childcare, the responsible benefits administrator 130 opens a benefits account for the customer, including providing a unique identifier, and sends customer 110 a transaction token, such as benefit card 120 shown, for example, in FIG. 3. Benefit card 120 can include a magnetic stripe 310 for electronically storing data, including the identifier associated with the account of customer 110, as was discussed above.

Benefit card 120 can store personal benefits criteria associated with the level of assistance provided to customer 110, as is specified in the account of customer 110. Customer 110 swipes benefit card 120 at a terminal 150 located at the site of care provider 140 at the start and end of each session during which childcare services are rendered. The start and stop times may be stored in terminal 150, on benefit card 120, and/or transmitted through network 206 to childcare processing system 200, where it is accessible to benefits administrator 130. In some embodiments, benefit card 120 is linked with customer 110's financial account separate from the benefits account, facilitating the transfer of funds from the financial account to cover a co-payment or other amount not covered by the benefits approved for customer 110 at the time of childcare service.

Transaction Record

Figure 4:
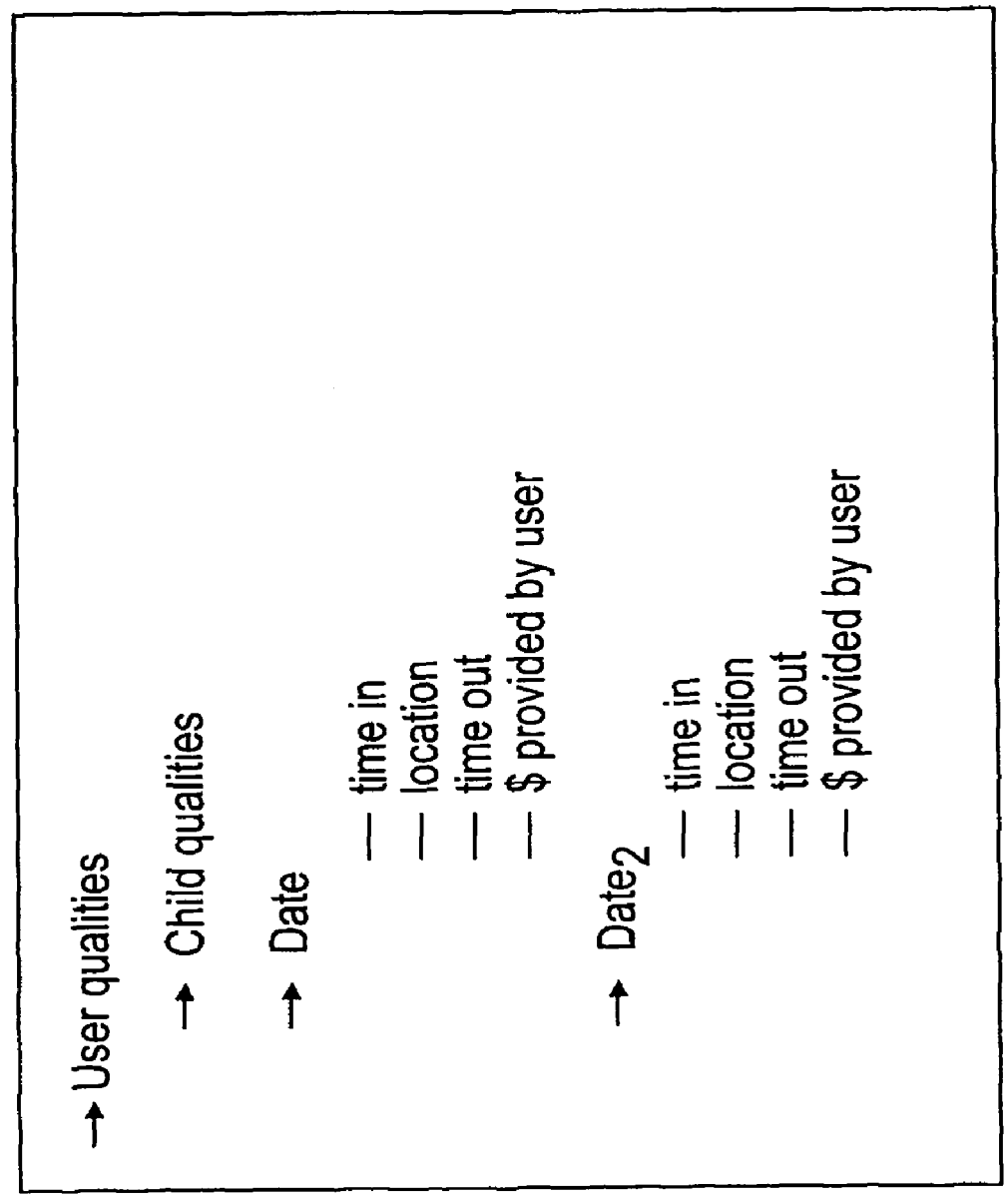
FIG. 4 shows a diagram illustrating a transaction record consistent with methods and systems of the present invention.

FIG. 4 is a diagram of a transaction record 160 created at terminal 150. Transaction record 160 stores information, including customer information, date, location, start time for care, end time for care, co-payment amount, and other relevant transaction information. Transaction record 160 may include information for one or more transactions. Transaction record 160 may refer to one customer 110 or to one or more children of customer 110 or may include all information for a provider 140.

Transaction record 160 can include any information that records the time in and time out parameters for service provided at childcare provider 140. Further, transaction record 160 can be formatted in any way. In some embodiments, transaction record 160 includes fixed fields for transmitting data regarding the transaction. In some embodiments, transaction record 160 includes one or more of the following fields: record type; authorization number; authorization case number; authorization person number; contract number; transaction number; swipe date; swipe time; swipe type; current date; current time; completion code; paid amount; paid date; card number; user number; copay amount; pay source; reason code; deduction amount; transaction phone number; POS phone number; last used date; reference number; maximum number of paid FT days; Maximum number of paid PT days; Maximum number of absent days; previous period FT day count; previous period PT day count; current period FT day count; current period PT day count; previous period FT days remaining; previous period PT days remaining; current period FT days remaining; current period PT days remaining; previous period cumulative copay; current period cumulative copay; copay amount; copay percent; previous period remaining copay; current period remaining copay; copay effective date; part time rate; full time rate; copay flag; last modified date; last modified by. Descriptions of these various example fields are provided in Table I below.

The record type field can indicate one of several types of records for transmission between childcare provider 140 and childcare processing system 200. For example, the following record types may be indicated numerically in transaction record 160: swipes, manual override swipes, manual entry, administrative terminal entry, administrative terminal adjustments, payment to provider, absence payments, client inactivity report, card status entries, declined transactions, and pending transactions. Descriptions of these record types are provided in Table II below. Records of these various types are transmitted between terminal 150 and benefits administrator 130 through child care processing system 200, as is illustrated in FIG. 2.

TABLE I

Examples of Fields that may be present in record 160.

| Data Field | Description |
| --- | --- |
| Record Type | The record type field indicates the type of record 160. Various record types are described in Table II. |
| Authorization Number | The authorization number field contains a unique number created by benefits administrator 130 at the time customer 110 is authorized to receive services at childcare provider 140. |
| Authorization Case Number | The authorization case number field contains the case number assigned by benefits administrator 130 associated with authorization of services at childcare provider 140. |
| Authorization Person Number | The authorization person number filed contains a number assigned to the person (i.e., child) associated with a particular attendance transaction. Each person associated with card 120 who is eligible to receive services at childcare provider 140 is assigned a person number unique to the case number for card 120. |
| Contract Number | The contract number field contains information indicated the contract between benefits administrator 130 and childcare provider 140 for provision of services to customer 110. |
| Transaction Number | The transaction number field contains a number associated with the particular transaction. Transaction numbers may be assigned by childcare processing system 200 for utilization in terminal 150. |
| Swipe Date | The swipe data field provides the date of services provided by childcare provider 140. In some embodiments, the date is provided by terminal 150 or can be manually entered at terminal 150 to be a date prior to the date of data entry. |
| Swipe Time | The swipe time field provides the time of attendance and is typically provided by terminal 150 as the time card 120 is inserted into terminal 150. |
| Swipe Type | The swipe type field indicates whether the attendance is being recorded as an "in" or an "out" type, i.e. when customer 110 arrives for service or leaves after service. |
| Current Date | The current date field indicates the date the transaction indicated in record 160 was recorded. |
| Current Time | The current time field indicates the date the transaction indicated in record 160 was recorded. |
| Completion Code | The completion code field indicates the authorization code returned to childcare provider 140 after customer 110 inserts card 120. An indication of whether the transaction is approved, denied or pending, with additional detail, may be provided. |
| Paid Amount | The paid amount field indicates the monetary amount paid to childcare provider 140 to compensate for provision of services. |
| Paid Date | The paid date field indicates the payment date to provider. |
| Card Number | The card number field indicates the identification of card 120 and can be captured by terminal 150 from card 120. |
| User Number | The user number field indicates a number associated with a user's input of a transaction record 160 through a device other than one of terminal 150. |
| CoPay Amount | The copay amount field indicates the monetary amount that has accumulated against the indicated transaction. |
| Pay Source | The pay source field indicates the source of funds for payment of the benefits associated with the transaction indicated by record 160. |

TABLE I-continued

Examples of Fields that may be present in record 160.

| Data Field | Description |
| --- | --- |
| Reason Code | The reason code field indicates the reason for any adjustment in the transaction or rejection of the transaction indicated by record 160. |
| Deduction Amount | The deduction amount field indicates the monetary amount deducted from a payment to childcare provider 140 in order to recoup past overpayments to childcare provider 140. |
| Transaction Phone Number | The transaction phone number field indicates the phone number associated with terminal 150. |
| POS Phone Number | The POS phone number field indicates the phone number associated with childcare provider 140, where terminal 150 is located. |
| Last Used Date | The lased used date field indicates the date that card 120 was last used in a transaction. |
| Reference Number | The reference number field indicates a reference number assigned by benefits administrator 130 associated with an adjustment to childcare provider 140. |
| Max Number of Paid FT Days | The Max Number of Paid FT Days field indicates the number of full-time days of subsidized service that child indicated in the authorization person number field is authorized to receive during the calendar month. |
| Max Number of Paid PT Days | The Max Number of Paid PT Days field indicates the number of part-time days of subsidized service that a child indicated in the authorization person number field is authorized to receive during the calendar month. |
| Max Number of Absent Days | The Max Number of Absent Days field indicates the maximum number of days for which childcare provider 140 may receive payment for services even if the child indicated in the authorization person number field is absent during the calendar month. |
| Previous Period FT Day Count | The previous period FT day count field indicates the number of full time days of day care that the child indicated in the authorization person number field received during the previous calendar month. |
| Previous Period PT Day Count | The previous period PT day count field indicates the number of part time days of day care that the child indicated in the authorization person number field received during the previous calendar month. |
| Current Period FT Day Count | The current FT day count field indicates the number of full time days of service that the child indicated in the authorization person number field has received during the current calendar month. |
| Current Period PT Day Count | The current period PT day count field indicates the number of part time days of service that the child indicated in the authorization person number field has received during the current calendar month. |
| Previous Period FT Days Remaining | The previous period FT days remaining field indicates the unused number of full-time days of service that the child indicated in the authorization person number field has available from the previous calendar month. |
| Previous Period PT Days Remaining | The previous period PT days remaining field indicates the unused number of part-time days of service that the child indicated in the authorization person number field has available from the previous calendar month. |
| Current Period FT Days Remaining | The current period FT days remaining field indicates the unused number of full-time days of day care that the child indicated in the authorization person number field has available for the current calendar month. |
| Current Period PT Days Remaining | The current period PT days remaining field indicates the unused number of part-time days of day care that the child indicated in the authorization person number field has available for the current calendar month. |

TABLE I-continued

Examples of Fields that may be present in record 160.

| Data Field | Description |
|---|---|
| Previous Period Cumulative CoPay | The previous period cumulative copay field indicates the monetary amount of the copay that accumulated for the child indicated in the authorization person number field during the previous calendar month. |
| Current Period Cumulative CoPay | The current period cumulative copay field indicates the monetary amount of the copay that accumulated for the child indicated in the authorization person number field during the current calendar month. |
| CoPay Amount | The copay amount field indicates the monetary value of the copay that is due from customer 110 to childcare provider 140 for the child indicated in the authorization person number field during the previous calendar month. |
| CoPay Percent | The copay percent field indicates the percentage of the services rate that should be used to calculate the daily copy due from customer 110 to childcare provider 140. |
| Previous Period Remaining CoPay | The previous period remaining copay field indicates the monetary value of the uncollected copy from customer 110 associated with the child indicated in the authorization person number field during the previous calendar month. |
| Current Period Remaining CoPay | The current period remaining copay field indicates the monetary value of the uncollected copy from customer 110 associated with the child indicated in the authorization person number field during the current calendar month. |
| CoPay Effective Date | The copay effective date field indicates the earliest date that copay is due from customer 110 to childcare provider 140 for the effective authorization. |
| Part Time Rate | The part-time rate field indicates the monetary value due to childcare provider 140 for one day of part-time services for the child indicated in the authorization person field with the current authorization. |
| Full Time Rate | The full-time rate field indicates the monetary value due to childcare provider 140 for one day of full-time services for the child indicated in the authorization person field with the current authorization. |
| CoPay Flag | The copay flag field indicates whether or not there is a copay allocated to the case associated with this authorization. |
| Last Modified Date | The last modified date field indicates the date that the case data associated with this authorization was last modified. |
| Last Modified By | The last modified by field indicates the user identification of the benefits administrator 130 who last modified data associated with this authorization. |

TABLE II

DESCRIPTION OF EXAMPLE RECORD TYPES

| Record Type | Description of Record Type |
|---|---|
| swipes record | A swipes record type includes an attendance transaction, including a date/time stamp in and out and data identifying and authorizing customer 110 for the services at childcare provider 140. A swipes record is typically created when customer 110 utilizes card 120 in terminal 150. |
| Manual Override Swipes | A manual override swipes record is a record of an attendance transaction that was not captured at the time service was provided at childcare provider 140 and that was entered through terminal 150 manually without card 120. |
| Manual Entry | A manual entry record type indicates an attendance transaction captured when customer 110 enters an identifying card number and attendance data manually at terminal 150. |
| Administrative Terminal Entry | An administrative terminal entry record type indicates a manual entry of an attendance transaction entered by benefits administrator 130. |
| Administrate Terminal Adjustments | An administrative terminal adjustment record type indicates an adjustment to an existing record created by benefits administrator 130. |
| Payment to Provider | A payment to provider record type indicates a detailed payment record to childcare provider 140. |
| Absence payments | An absence payment record type indicates payment to childcare provider 140 for periods where children covered by card 120 are absent. |
| Client Inactivity Report | A client inactivity report record type indicates a detailed list of case numbers where card 120 has not been utilized in a set period of time (for example 14 days). |
| Card Status Entries | A card status entry record type indicates the status of card 120, for example active or inactive. |
| Declined Transactions | A declined transactions record type indicates Swipe type entries where service is declined by benefits administrator 130. |
| Pending Transactions | A pending transactions record type indicates that customer 110 has applied for services at childcare provider 140 but that those services have not yet been approved by benefits administrator 130. |

As shown in FIG. 4, a simplified example of transaction record 160 is shown. The fields indicated in FIG. 4 includes the following: the user qualities, which includes information about the authorization of services afforded to customer 110; the identification and authorization for the child receiver services at childcare provider 140; the time-in parameter indicating the start of services; the time-out parameter indicating the conclusion of services; the location identification of childcare provider 140; the date of the services; and the amount of copay provided by customer 110 for those services.

Terminal

Figure 5:
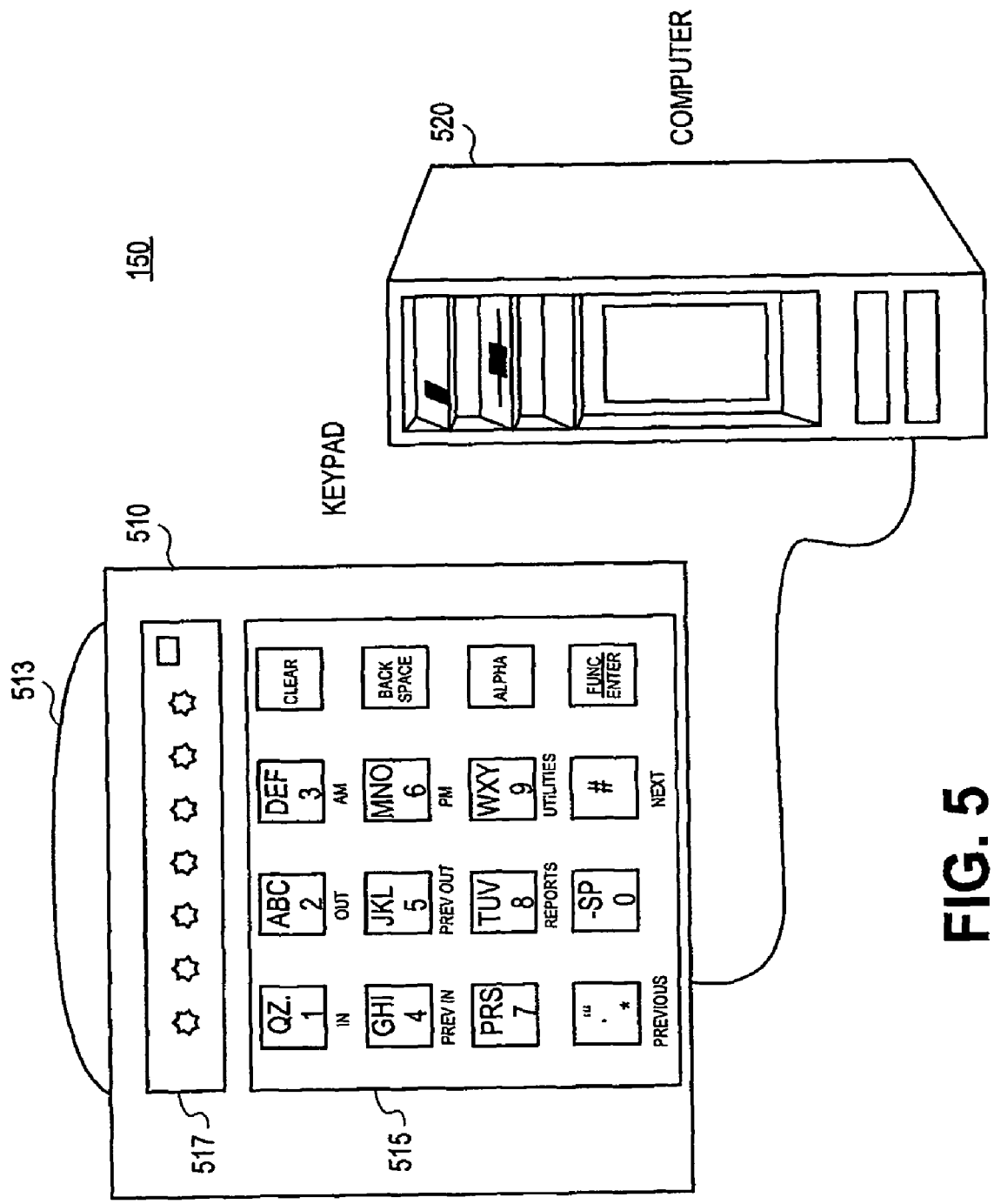
FIG. 5 shows a diagram illustrating a terminal consistent with methods and systems of the present invention.

FIG. 5 illustrates a block diagram of an embodiment of terminal 150 consistent with methods and systems of the present invention. Terminal 150 includes an interaction device 510 and a local computer 520.

Terminal 150 electronically executes transactions (i.e., builds record 160 from available date stored on card 120 or in computer 520) and processes transaction information to calculate payment data over a predefined period of time. Interaction device 510 is connected to send payment data and transaction information read from card 120 to local computer 520 and in some embodiments to write or modify information on card 120. Interaction device 510 can include a card reader 513, a keypad 515, and a display 517. In some embodiments, display 517 may be combined with a display terminal that is also coupled with computer 320.

Card reader 513 includes electronic circuitry that enables interaction device 210 to extract identification information from benefit card 120 (not shown). Although, FIG. 5 illustrates card reader 513 as a raised structure on the top portion of interaction device 510, it should be apparent that card reader 513 could be located at various positions on the structure of interaction device 513. Furthermore, card reader 513 may have any appropriate design configuration.

Keypad 515 includes a plurality of buttons that may be labeled with at least one alphanumeric character, which character may be presented to a user on display 517 when a button is depressed. The buttons may also perform other functions identified by functional descriptions inscribed on keypad 515 in close proximity to the respective button. Button 3, for example, may be labeled with the letters D, E, and F, and the number 3. Moreover, the functional description "AM" may be located beneath button 3, which informs a user that button 3 may be used when defining the time of day. In some embodiments, keypad 515 may be a separate keyboard that is coupled to computer 520.

Display 517 can be a standard liquid crystal display device. In response to a user's input or a processing event, display 517 presents any of a number of alphanumeric characters or text messages to the user.

Local computer 520 stores payment data and transaction information received from interaction device 510. Local computer 520 includes software for organizing and processing payment data and transaction information. Local computer 520 may, for example, include software to generate an annual billing report for benefits administrator 130. Local computer 520 preferably provides an annual billing report accessible by or transferable to childcare processing system 130 through network 206 so that benefits administrator 130 may access the information from childcare processing system 130 over network 207. Moreover, local computer 520 further preferably generates reports in response to a request or query submitted to child care provider system 200 over a network coupled to child care provider system 200. The request may come from benefits administrator 130 or from other administrative institutions authorized to access that information in child care provider system 200. Embodiments of terminal 150 may combine interaction device 510 and computer 520 into one functional unit.

After customer 110 submits benefit card 120 to card reader 513, display 517 can be utilized to prompt customer 110 for any additional information required to complete the requested transaction. As discussed above, card reader 513 may obtain personal benefits information of customer 110 from benefit card 120. In some embodiments, a personal identification number (PIN) or other form of authorization may be required to ensure that a customer 110 is in fact the one using benefit card 120.

Customer 110 verifies attendance at childcare provider 140, for example, by using keypad 515 to input personal benefits information as prompted by display 517. After inputting the personal information, customer 110 uses keypad 517 to input additional information for completing the transaction as directed by computer 520 through display 517.

Exemplary Computing System

Figure 6:
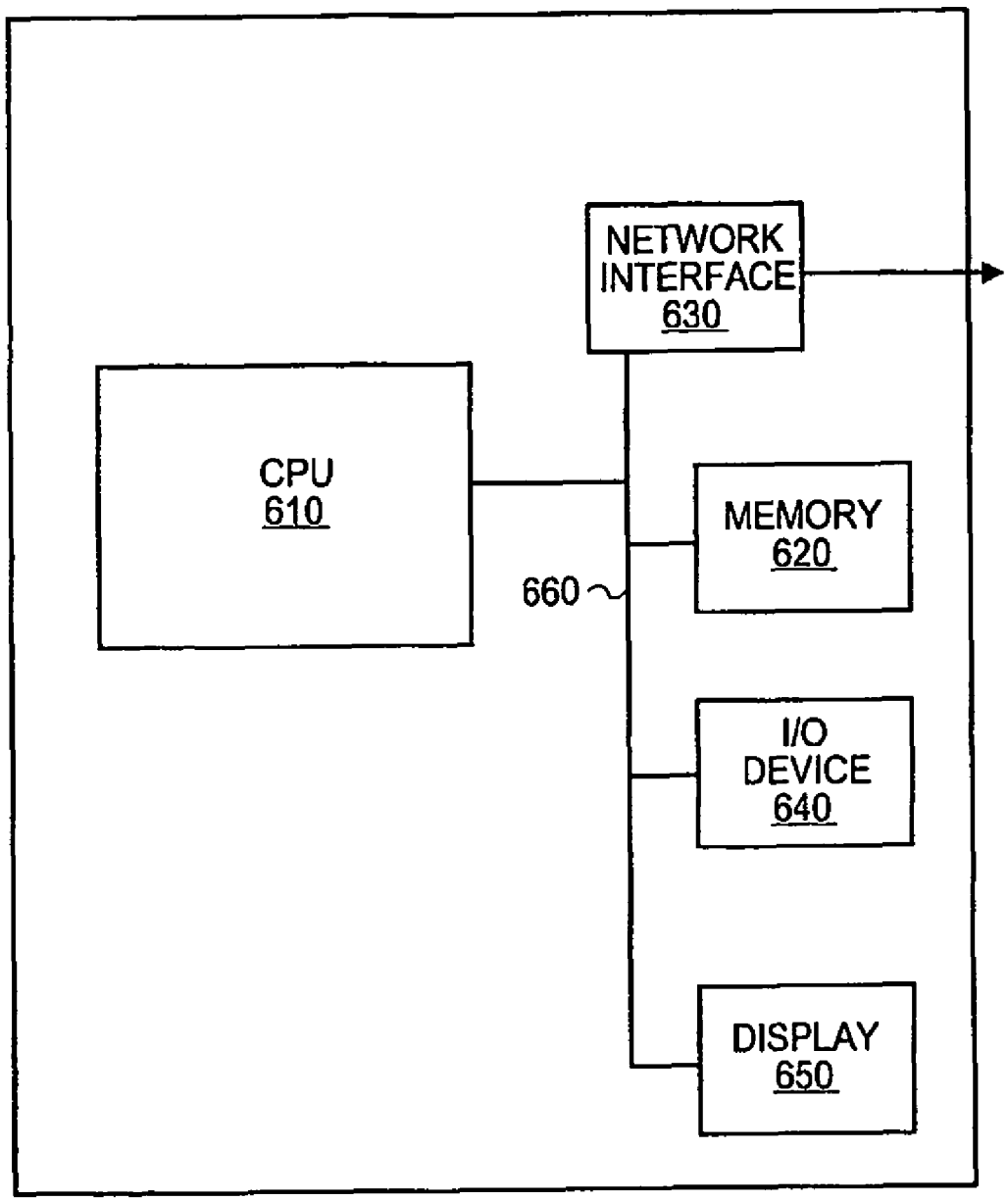
FIG. 6 shows a block diagram of an exemplary computing system consistent with methods and systems of the present invention.

FIG. 6 shows a block diagram of an exemplary computing system 600, consistent with an embodiment of the invention. Computing system 600 may represent, for example, the internal components of computer 520 or childcare processing system 200. By way of example, a program or set of instructions to run the childcare processing system 200 may be implemented in computing system 600.

Computing system 600 may include a number of components, such as a processor or central processing unit (CPU) 610, a memory 620, a network interface 630, I/O devices 640, and/or a display 630. Such components may be interconnected by a system bus 660. CPU 610 may be a microprocessor such as the Pentium® family of microprocessors manufactured by Intel Corporation. However, any other suitable microprocessor, micro-, mini-, or mainframe computer may be used, such as a micro-controller unit (MCU), or a digital signal processor (DSP).

Memory 620 may include a random access memory (RAM), a read-only memory (ROM), a video memory, mass storage, and/or cache memory such as fixed and removable media (e.g., magnetic, optical, or magnetic optical storage systems or other available mass storage technology). Memory 620 stores support modules such as, for example, a basic input/output system (BIOS), an operating system (OS), a program library, a compiler, an interpreter, and/or a text-processing tool. Support modules are commercially available and can be installed on computing system 600 by those of skill in the art. For simplicity, these modules are not illustrated. Further, memory 620 may contain an operating system, an application routine, a program, such as a web browser program, an application-programming interface (API), and/or other instructions for performing methods consistent with embodiments of the invention.

Network interface 630, examples of which include Ethernet, dial-up telephone and/or other conventional data port connections, may be used to communicate with other devices through, for example, a communication network (not shown). Computing system 600 may also receive input via input/output (I/O) devices 640, which may include a keyboard, pointing device, or other like input devices. Computing system 600 may also provide output via input/output (I/O) devices 640, which may include interface device 510. Computing system 600 may also present information and interfaces, such as a care application, via display 650 to customer 110.

Bus 660 may be a bi-directional system bus. For example, bus 660 may contain thirty-two address bit lines for addressing a memory 620 and thirty-two bit lines across which data is transferred among the components. Alternatively, multiplexed data/address lines may be used instead of separate data and address lines.

Childcare Processing System

Figure 7:
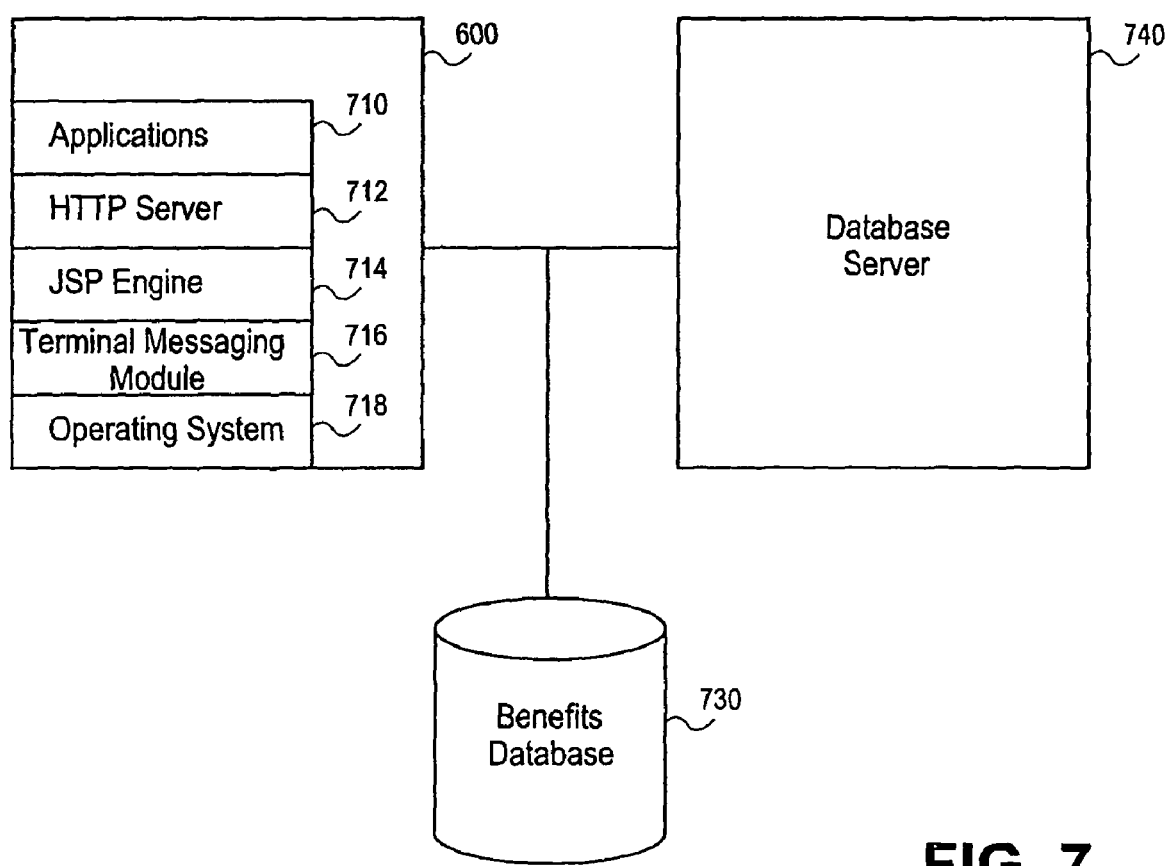
FIG. 7 shows a diagram illustrating a childcare processing system consistent with methods and systems of the present invention.

FIG. 7 is a diagram illustrating a childcare processing system 200, consistent with methods and systems of the present invention. As shown the childcare processing system may include a computing platform 600, a database server 740, and a benefits database 730. Computing platform 600 may further comprise applications 710, HTTP server 712, JSP engine 714, terminal messaging module 716, and Operating System 718. HTTP server 712 may provide automatic file processing ability using, for example, an Extended Markup Language ("XML") processor that may automatically process files received from a government entity. In some embodiments, for example, the received file may comply with an XML schema and relying upon that schema an XML processor may extract records located in the file.

The file may be at least one of a childcare customer account setup file, a childcare customer account update file, and a childcare customer update file, or a childcare provider account setup file, a childcare provider account update file, and a childcare provider update file. By processing any of these files account setup, account update, and benefits processing and payments may be processed. Automatic processing of the file may further include acknowledging a receipt of the file, validating a format of the file; and processing the records located in the file. Thus, for example, processing of the file may include extracting the relevant information from the file and updating databases related to benefits information, such as benefits database 730.

HTTP server 712 may be any HyperText Transport Protocol compatible server, such as Apache Web Server, Microsoft IIS, or Netscape Enterprise Server. Although FIG. 7 depicts a HTTP-based system, one may use any equivalent system that enables remote devices to access functionality located on the childcare processing system.

JSP Engine 714 may include Java Server Pages-related technology (a technology from Sun Microsystems) permitting delivery of dynamic content to the users of childcare processing system 200. In some embodiments, Java language from Sun Microsystems may be used for scripting applications 710. JSP Engine 714 may further have access to Sun Microsystem's J2EE platform for accessing the relevant software libraries/modules. Other similar technologies, such as Active Server Pages (from Microsoft) may also be used. Additionally, CGI scripts or similar technologies that do not necessarily separate page design from programming logic may also be used.

Terminal messaging module 716 may provide messaging functionality such as ISO 8583 messaging between a terminal and childcare processing system 200. Such messaging may be accomplished over X.25 and IP protocols or other appropriate protocols.

Operating system 718 may provide an interface between the various software modules of computing platform 600 and hardware associated with the computing platform. Operating system 718 may be implemented using Sun Microsystem's Solaris operating system. It may also be implemented using other appropriate operating systems such as UNIX, Linux, Microsoft NT, HP-UX, AIX, or any other operating system that may interface the software modules with the hardware associated with computing platform 600.

Database server 740 may be any database server program, such as Oracle 9i from Oracle that may be used to provide access to benefits database 730. Benefits database 730 may be a single database or distributed over multiple databases. Although FIG. 7 shows only one database, childcare processing system 200 may either include or connect to other databases as well.

Figure 8:
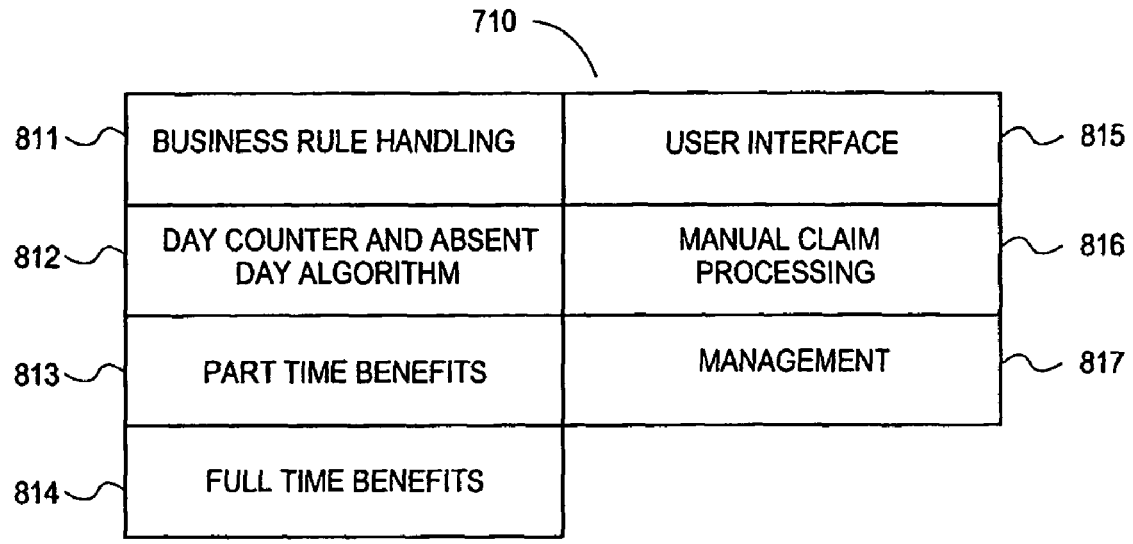
FIG. 8 shows a diagram illustrating various modules of the childcare processing system consistent with methods and systems of the present invention.

FIG. 8 shows various examples of applications 710 implemented by childcare processing system 200. Referring now to FIG. 8, applications 710 may include software components for calculating benefits including business rule handling 811, day counter and absent day algorithms 812, part time benefits 813, full time benefits 814, user interface 815, manual claim processing 816, and management 817. The functionality illustrated by these components may be combined or distributed further into sub-components. Additional functionality may be added using additional software components. A business rule indicates a limitation on making payments and may be dictated by the state or the entity that provides funding for the benefit. For example, a business rule may limit the amount of monetary compensation provided to a particular childcare provider 140 in a period of time.

Figure 9:
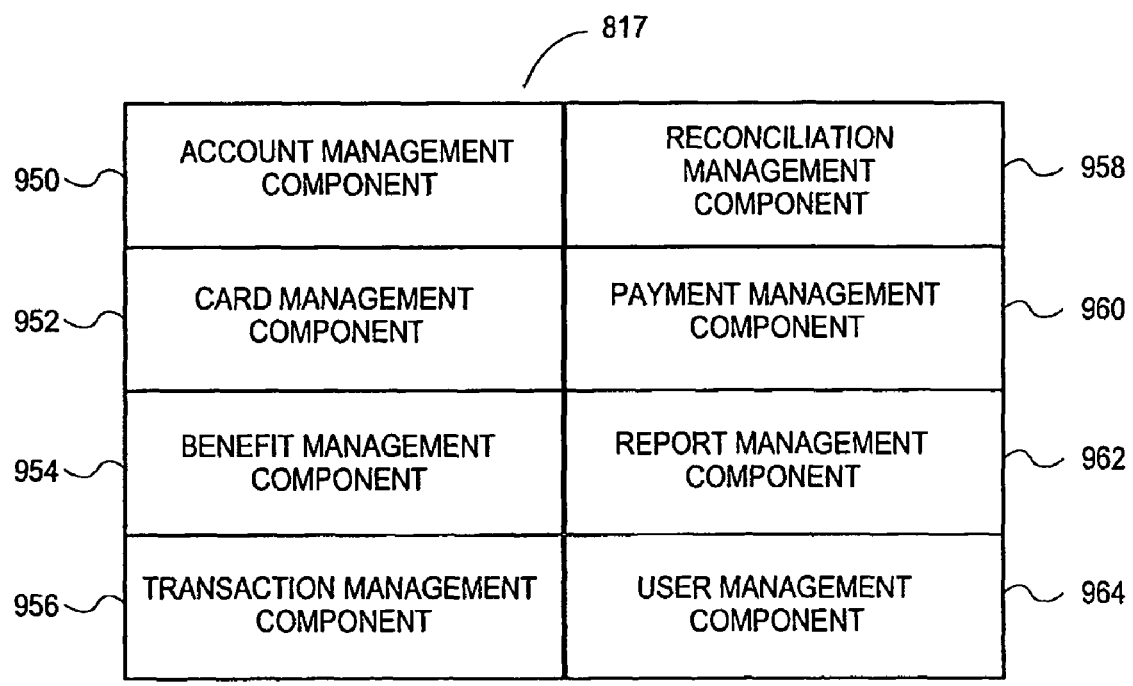
FIG. 9 shows a diagram illustrating various management applications of the childcare processing system consistent with methods and systems of the present invention.

FIG. 9 shows examples various management applications 817. Management applications 817 may comprise software components including an account management component 950, a card management component 952, a benefit management component 954, a transaction management component 956, reconciliation management component 958, a payment management component 960, a report management component 962, and a user management component 964. The functionality provided in these components may be combined or distributed further into sub-components. Additionally, more functionality may be added using additional software components.

Interfaces with Childcare Processing System

Figure 10A:
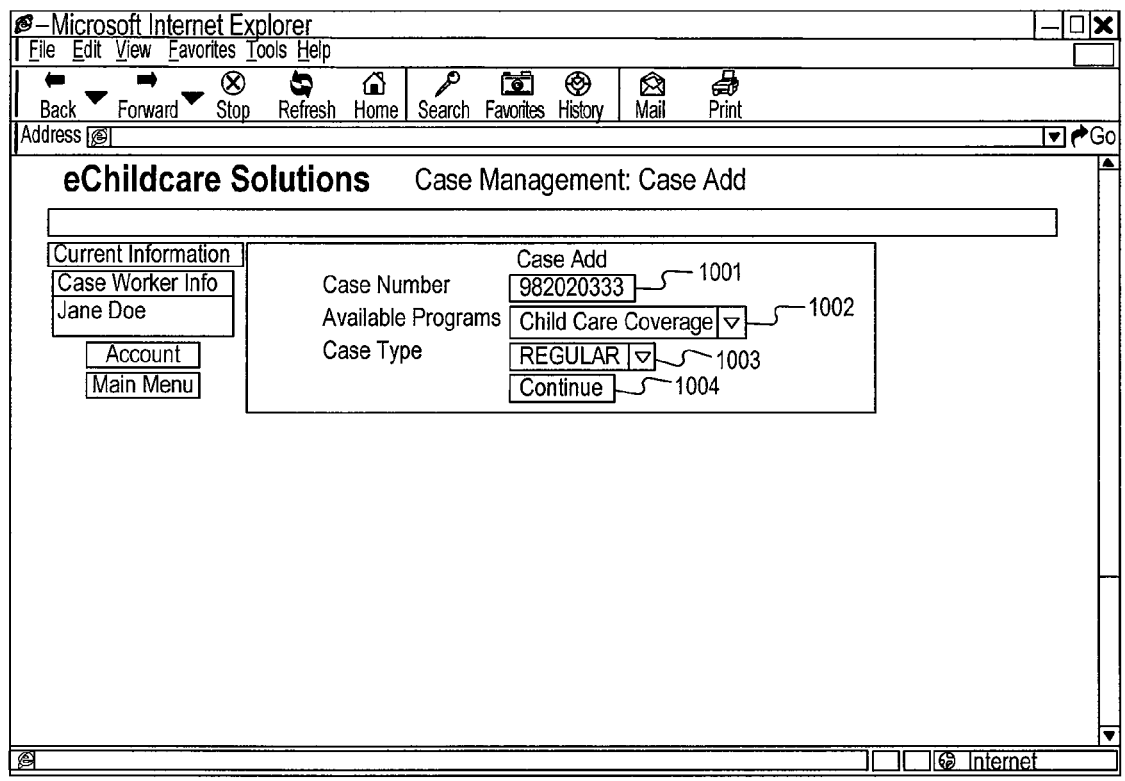
FIG. 10A shows a diagram illustrating an exemplary screen related to account setup consistent with methods and systems of the present invention.

FIG. 10A shows an exemplary screen related to establishing a benefits account for customer 110 or childcare provider 140. Account management component 950 may provide account creation for a childcare customer 110 or childcare provider 140. Thus, for example, benefits administrator 130, an authorized user of childcare processing system 200, may establish benefits to a customer 110 to receive services from a childcare provider 140. As has been indicated above, a case number 1001 is assigned to the authorization of services from childcare provider 140 by benefits administrator 140. Accordingly benefits administrator 140 may add a case with a certain case number 1001, assign it to one of the available programs that supplies benefits 1002, designate a case type 1003 and continue 1004 with processing. Further, as shown in FIG. 10B, benefits administrator 140, who may be any authorized user of childcare processing system 200, may provide relevant information 1010 concerning the new account with customer 110, which then may be stored, for example, in benefits database 730 shown in FIG. 7.

Figure 10C:
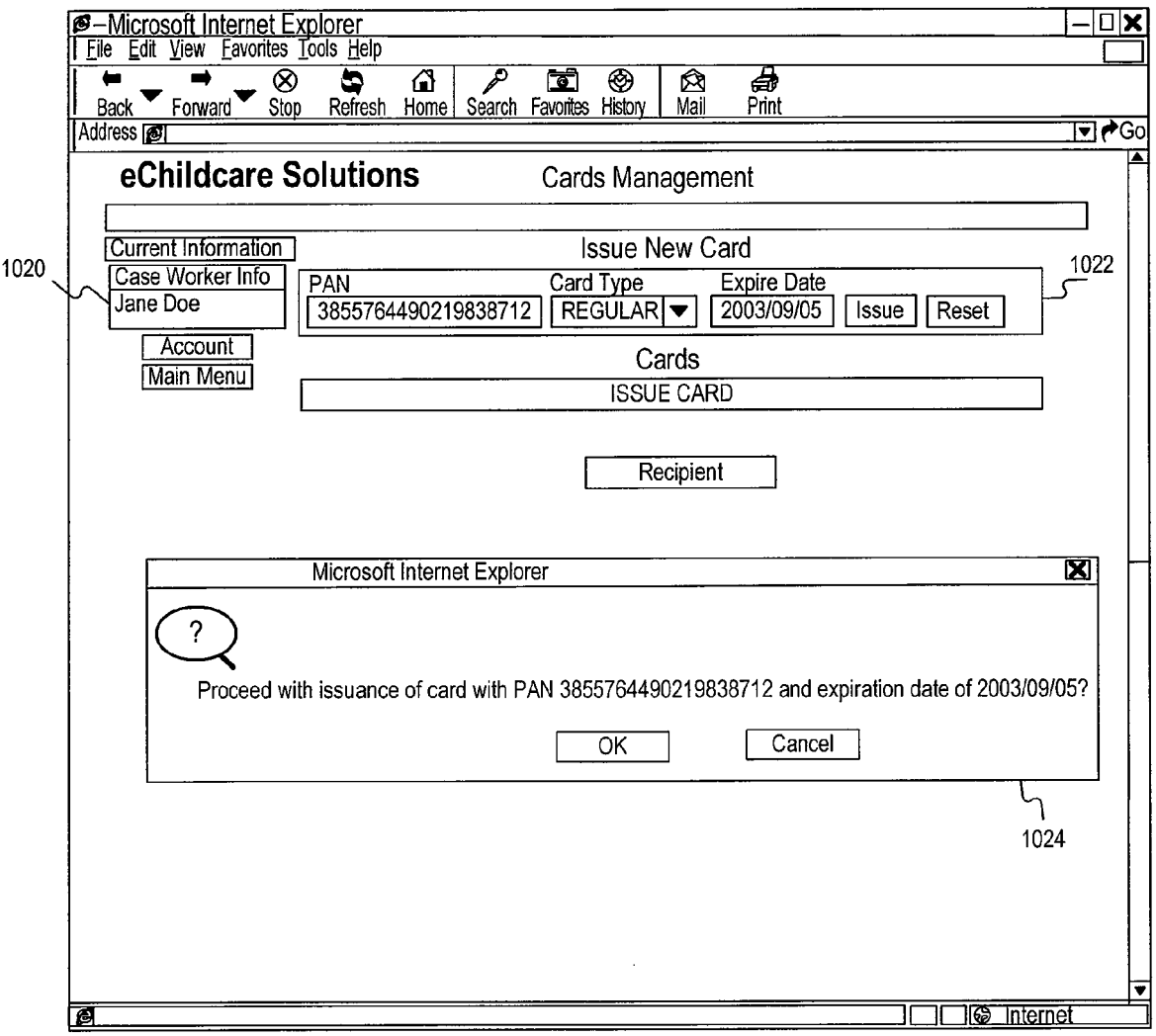
FIG. 10C shows a diagram illustrating an exemplary screen related to issuance of a new benefit card consistent with methods and systems of the present invention.

Card management component 952 may provide functionality associated with managing benefit card 120. Card management component 952 may include, among other things, functions associated with issuing new cards, activating the newly issued cards, replacing existing cards (for example damaged or lost cards), changing a card's status, displaying the history of a card (for example, showing all current and prior card numbers with replacement date and status), assigning an authorized representative and/or protective payee to a food stamp or a cash account, issuing a PIN associated with a particular card, and allowing childcare customer 110s to change PIN's, for example, using a POS terminal 150 or an ATM. As illustrated in FIG. 10C, card management component 952 may include issuance of a new card 1022. Accordingly, benefits administrator 130, identified by a caseworker 1020, may issue a card 120 to a childcare customer 110, based on information 1010. Once selected for issuance childcare processing system 200 may require confirmation before issuing card 120, for example by selecting "OK" in a confirmation window 1024. Additionally, as depicted in FIG. 10D, card management 952 may further permit replacement of a lost or damaged card 120 by entering appropriate information into replacement window 1030.

Figure 10E:
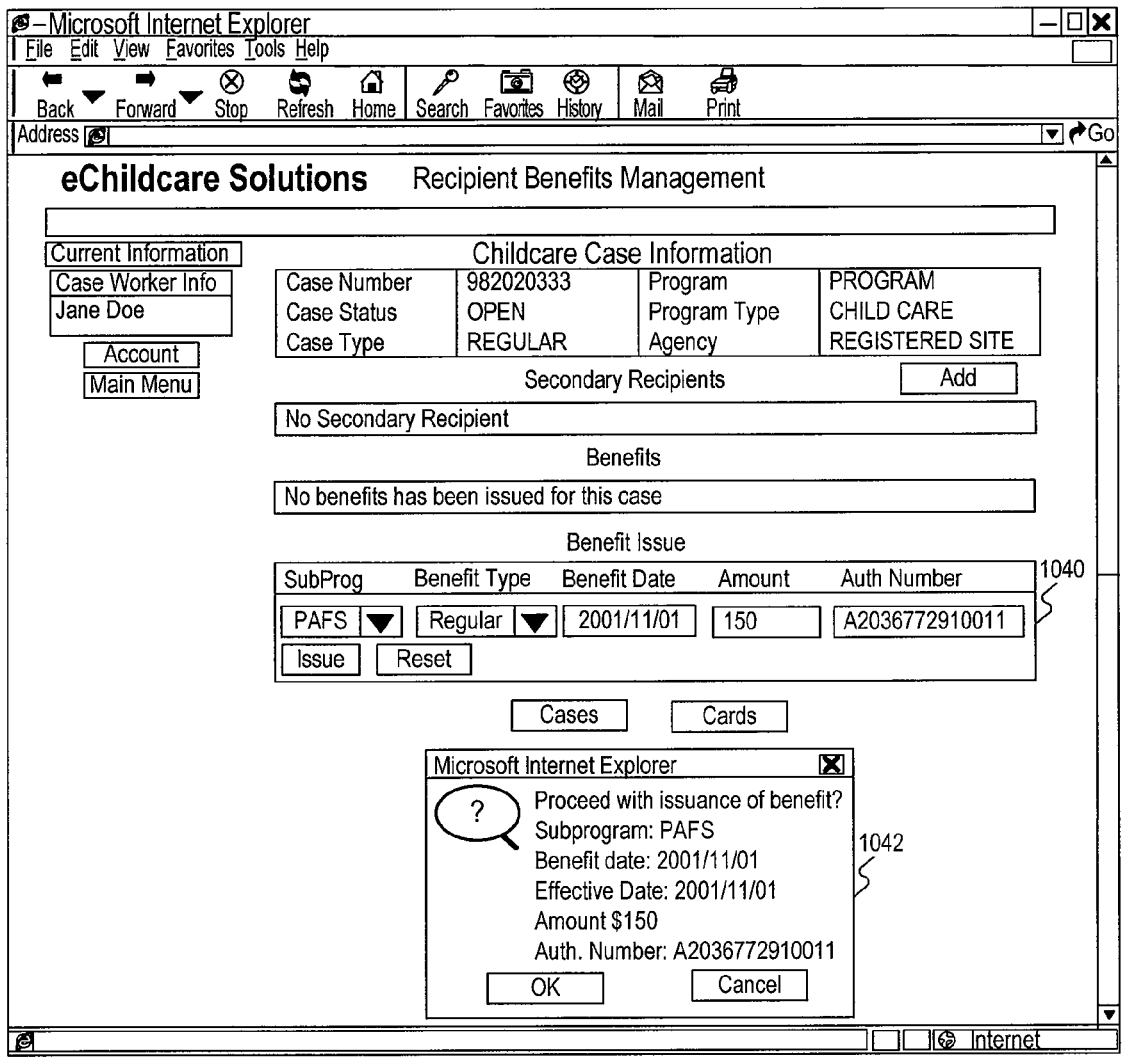
FIG. 10E shows a diagram illustrating an exemplary screen related to issuance of a childcare benefit to a childcare provider consistent with methods and systems of the present invention.

Referring again to FIG. 9, benefit management component 954 may provide functionality associated with managing benefits for various childcare customers 110. Benefit management component 954 may include, among other things, issuing new benefits, canceling existing benefits, and converting between benefits provided for customer 110. Benefits include authorization for childcare payment and/or any other government sponsored childcare benefits provided to either childcare provider 140 or directly to childcare customer 110 for childcare services. As shown in FIG. 10E, benefits administrator 130 may specify a particular benefits program, amount of the benefit, and any other relevant information and authorize the benefit to childcare customer 110. Accordingly, as shown in FIG. 10E, benefit type, benefit amount, and its effective date may be specified in benefits window 1040. Issuance of benefits may be confirmed in confirmation window 1042.

With reference to FIG. 9, transaction management component 956 may provide functionality associated with tracking transactions related to a particular childcare customer 110, a particular benefit, or a particular benefit program. Transaction management component 956 relates to transactions involving a single childcare customer 110 or transactions involving a childcare provider 140. Childcare customer transaction management may include displaying summary information on every use by any of customers 110 of a childcare provider 140 and displaying specific detailed information for each use.

Figure 10F:
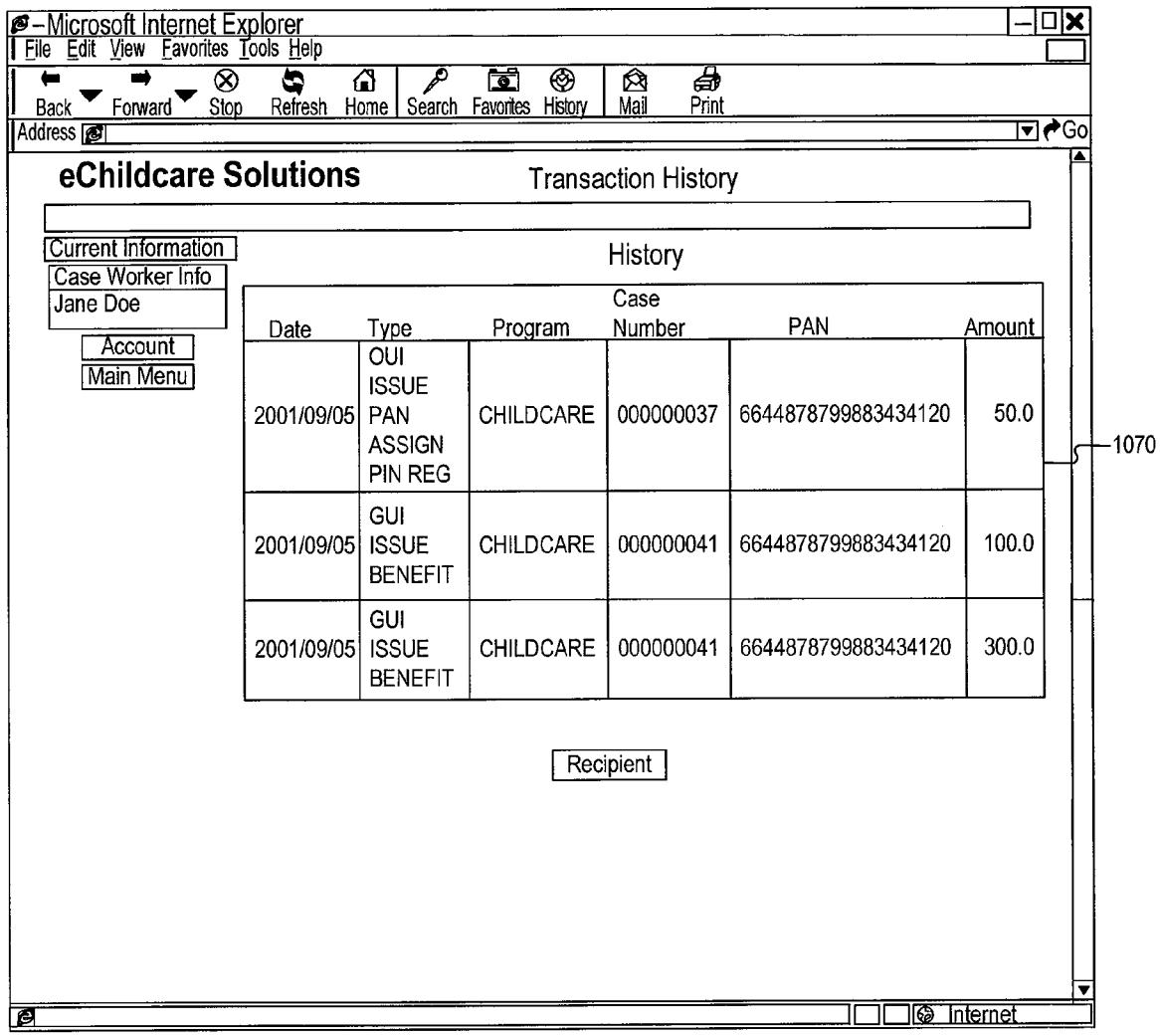
FIG. 10F shows a diagram illustrating an exemplary screen related to transaction history consistent with methods and systems of the present invention.

Childcare provider 140 transactions may include displaying summary information on every transaction for the childcare provider 140 by the date selected and displaying specifics on any particular transaction. Thus, for example, as illustrated in FIG. 10F, benefits administrator 130 may investigate a transaction history, illustrated in history window 1070, of a particular childcare customer 110. Alternatively, benefits administrator 130 may investigate a transaction history for a particular childcare provider 140.

Figure 10G:
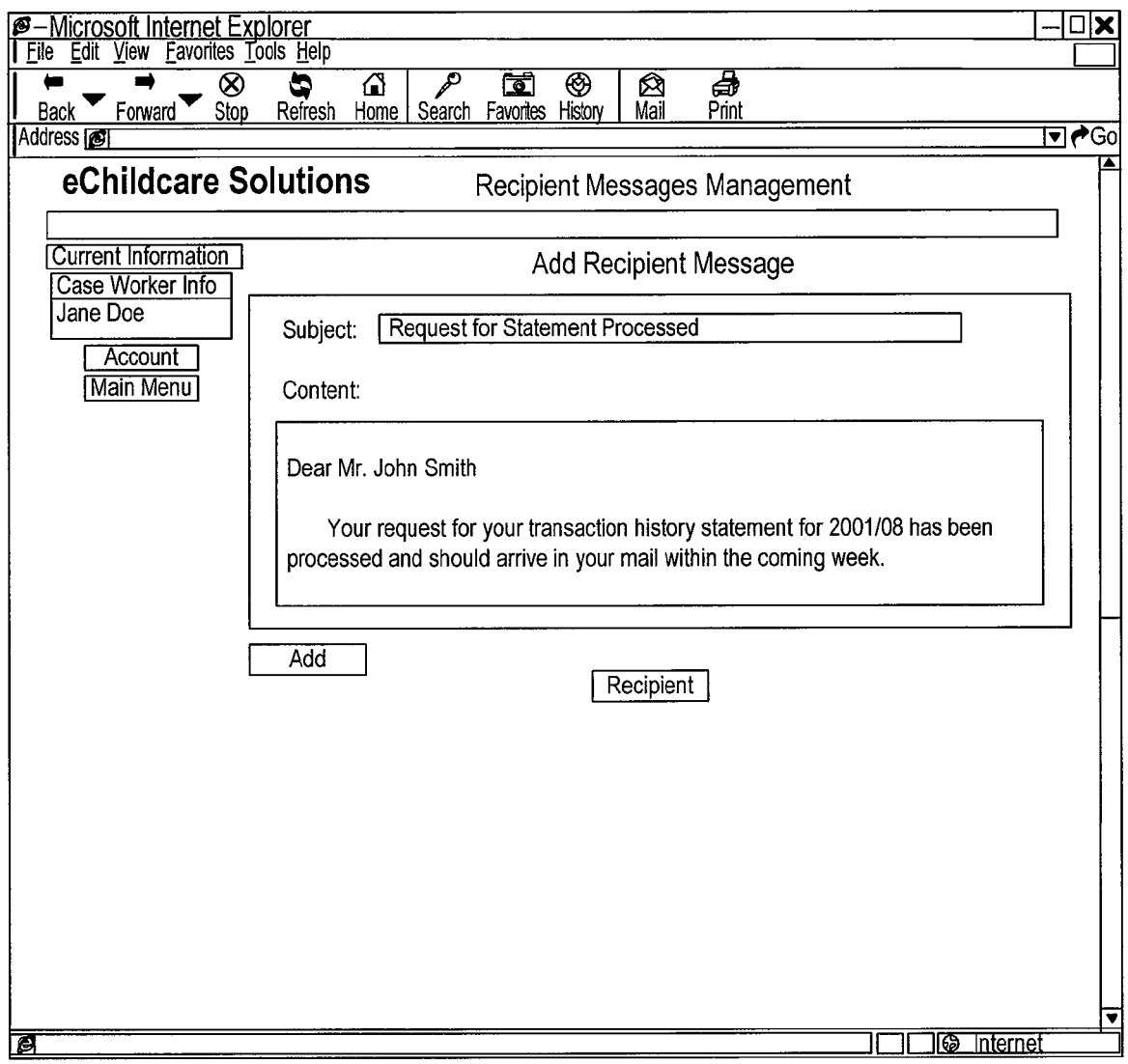
FIG. 10G shows a diagram illustrating an exemplary screen related to messaging for childcare providers and customers consistent with methods and systems of the present invention.

FIG. 10G illustrates a message provided by childcare processing system 200 in response to an inquiry from either a childcare customer 110 or childcare provider 140. Childcare processing system 200 may display at least one electronic message concerning the inquiry to childcare customer 110 through a graphical user interface. The at least one electronic mail message may be displayed in response to an inquiry from the childcare customer 110. Alternatively, it may be displayed even without any inquiry from the childcare customer 110. For example, the electronic message may provide updated information concerning benefits without being prompted by the childcare customer 110.

Referring again to FIG. 9, user management component 964 may include functionality related to managing user accounts, for example, adding a recipient message, modifying, and deleting user accounts. It may also include functionality related to adding, modifying, and deleting login privileges for various users (e.g., benefits administrators 130) of childcare processing system 200.

Reports

Figure 11:
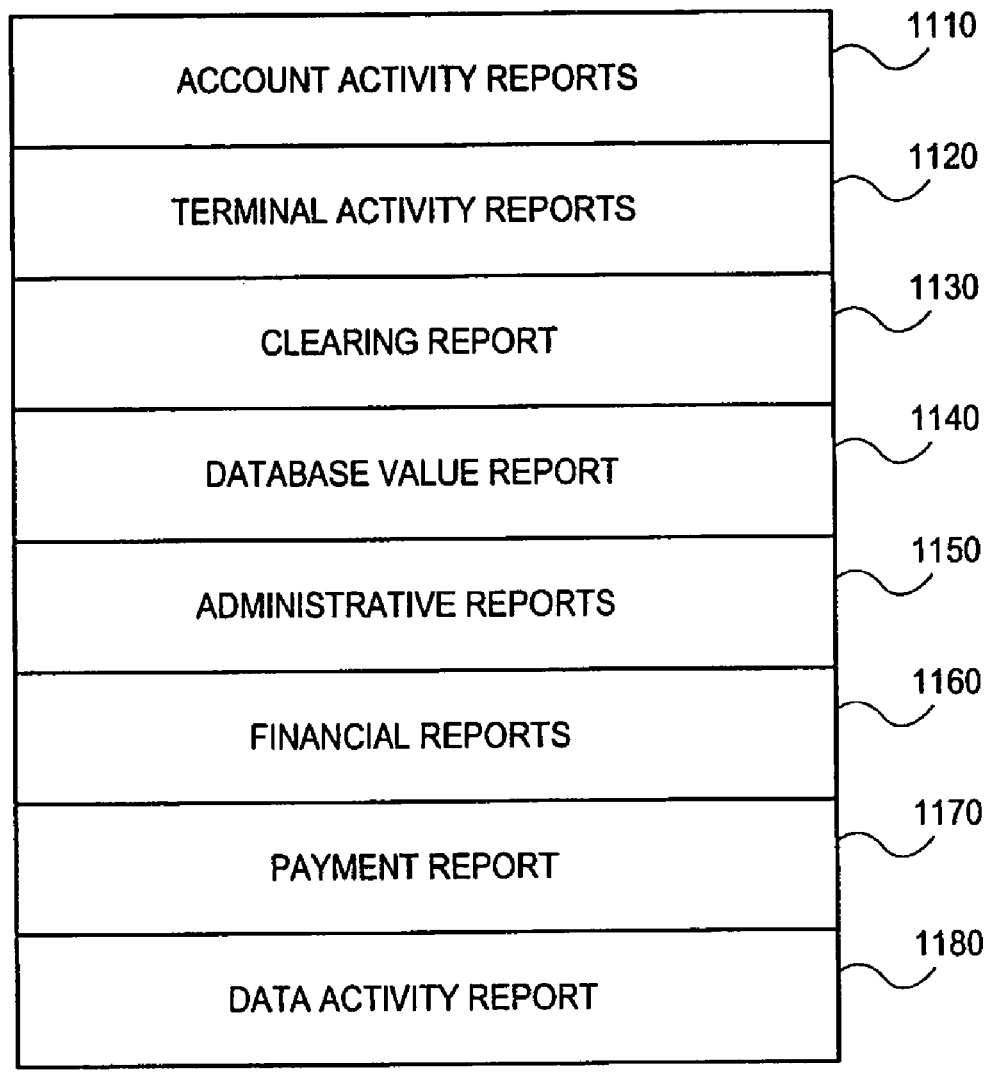
FIG. 11 shows a schematic diagram listing exemplary reports that may be generated consistent with methods and systems of the present invention.

Report management component 962 may provide functionality related to generating reports, viewing reports, and printing reports. It may also permit retrieval of archived data. FIG. 11 illustrates various reports 1100 that may be generated in report management component 962. Reports 1100 may include account activity reports 1110, terminal activity reports 1120, clearing reports 1130, database value reports 1140, administrative reports 1150, financial reports 1160, payment reports 1170 and data activity reports 1180. Account activity report 1110 may generate a report that reflects all transactions related to a customer 110, an authorized person associated with customer 110, or a childcare provider 140, for example, (i.e., an account) for a particular day. It may also provide information concerning all account related transactions done on behalf of a state or an agent of the state. Details may be provided related to any transaction that impacts an account balance, for example benefits associated with a customer 110 or childcare provider 140. Both a processor identification number and a batch file name associated with the transaction may identify a transaction originator.

Terminal activity reports 1120 may indicate all transactions that result in childcare service being provided to customer 110. Such a report may list the transaction type, the start and end time of childcare provided, the transaction date, and the benefits impacted by each transaction. Clearing report 1130 may provide information concerning total funds that are being transferred between, for example, funding agencies and childcare providers 140. Administrative reports 1150 includes any other reports related to the administration of benefits. Financial reports 1160 may relate to the various financial data concerning the benefits, which may be arranged in any manner.

FIG. 12A illustrates an exemplary payment report 1170. Payment report 1170 may include provider, facility and contract number information, along with a listing of authorized children associated with various customers 110 and attendance for the children during a payment period. FIG. 12B illustrates an exemplary data activity report 1180. Data activity report 1180 may include listings of total changes for a particular county, for example.

Methods of Interaction with Childcare Processing System

Figure 13:
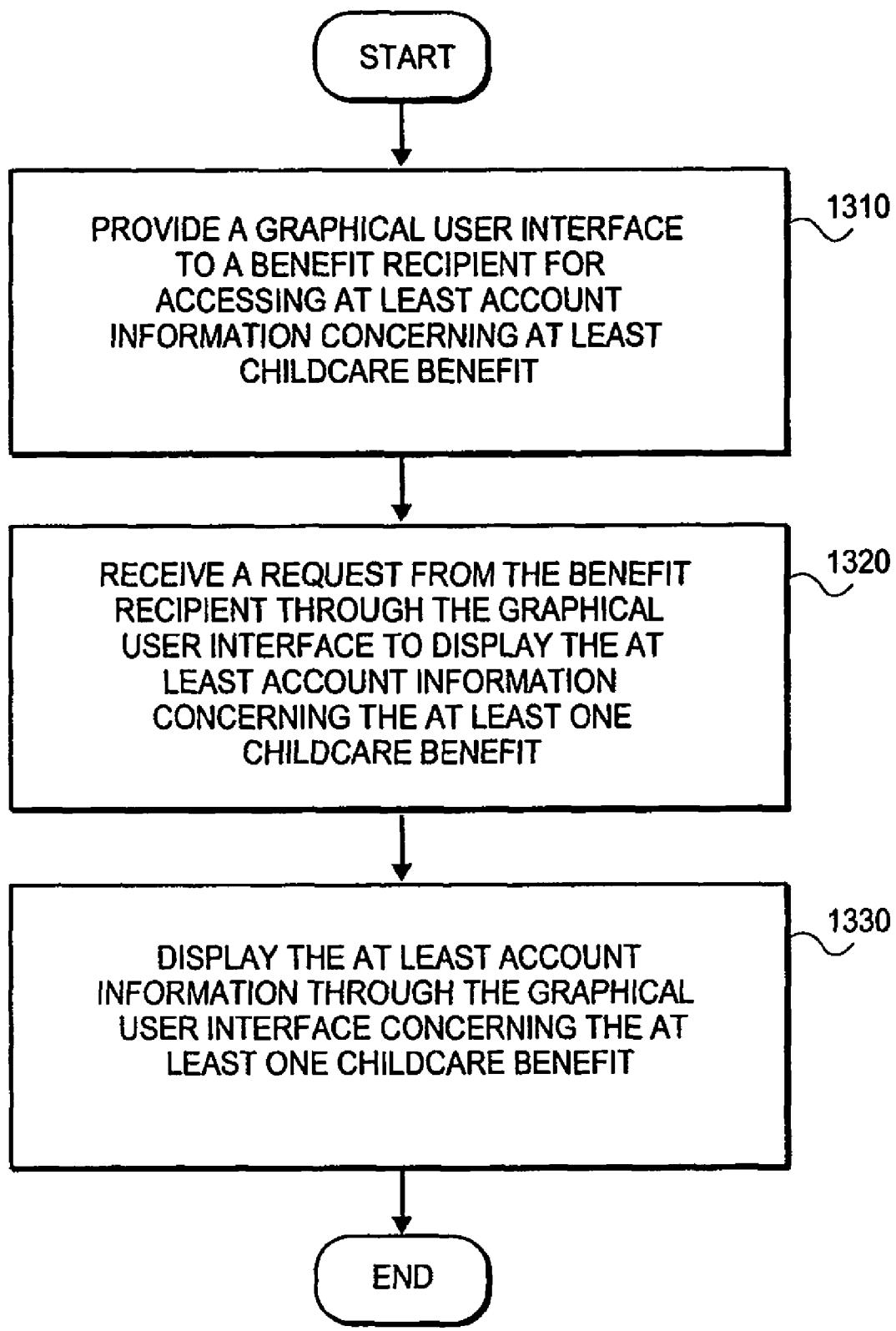
FIG. 13 shows a flow diagram illustrating an exemplary method for processing childcare benefits consistent with methods and systems of the present invention.

Referring now to FIG. 13, a flow chart is shown corresponding to an exemplary method for processing childcare benefits. As shown, the method may comprise providing a graphical user interface to childcare customer 110 for accessing at least account information concerning at least one benefit type (step 1310). The graphical user interface may be implemented using a web browser, for example, Microsoft Internet Explorer, Netscape Navigator, or any other similar software. The graphical user interface may be made available on a personal computer, a handheld computer, a television, a thin computer, or any other device capable of accessing a network, such as the Internet, via a graphical user interface. Interactive functionality may be provided using XML, Java Server Pages, Microsoft Active Server Pages or any other similar combination of software. For example, using a HTTP server 712 and JSP engine 714, which may be used to act as an intermediary between benefits database 730 (of FIG. 7) and the childcare customer 110. Using the graphical user interface, the childcare customer 110 may access at least account information concerning at least one benefit type. The term "account information" as used herein includes, but is not limited to, account balance information, and any other information related to the childcare customer 110.

Next, a request from childcare customer 110 through the graphical user interface may be received for displaying the at least account information concerning the at least one benefit type (step 1320). The childcare customer 110 may request information concerning the at least one benefit type using any user interface element, such as selecting an item from a pull-down list, clicking a button, or any other type of graphical user interface element.

As shown in FIG. 13, the at least account information concerning the at least one benefit type may then be displayed through the graphical user interface (step 1330). Consistent with this method, such information may be displayed immediately after receiving the request or may be displayed at a later time. Further, the childcare processing system may also display at least one electronic message concerning the at least one benefit type to the childcare customer 110.

Figure 14:
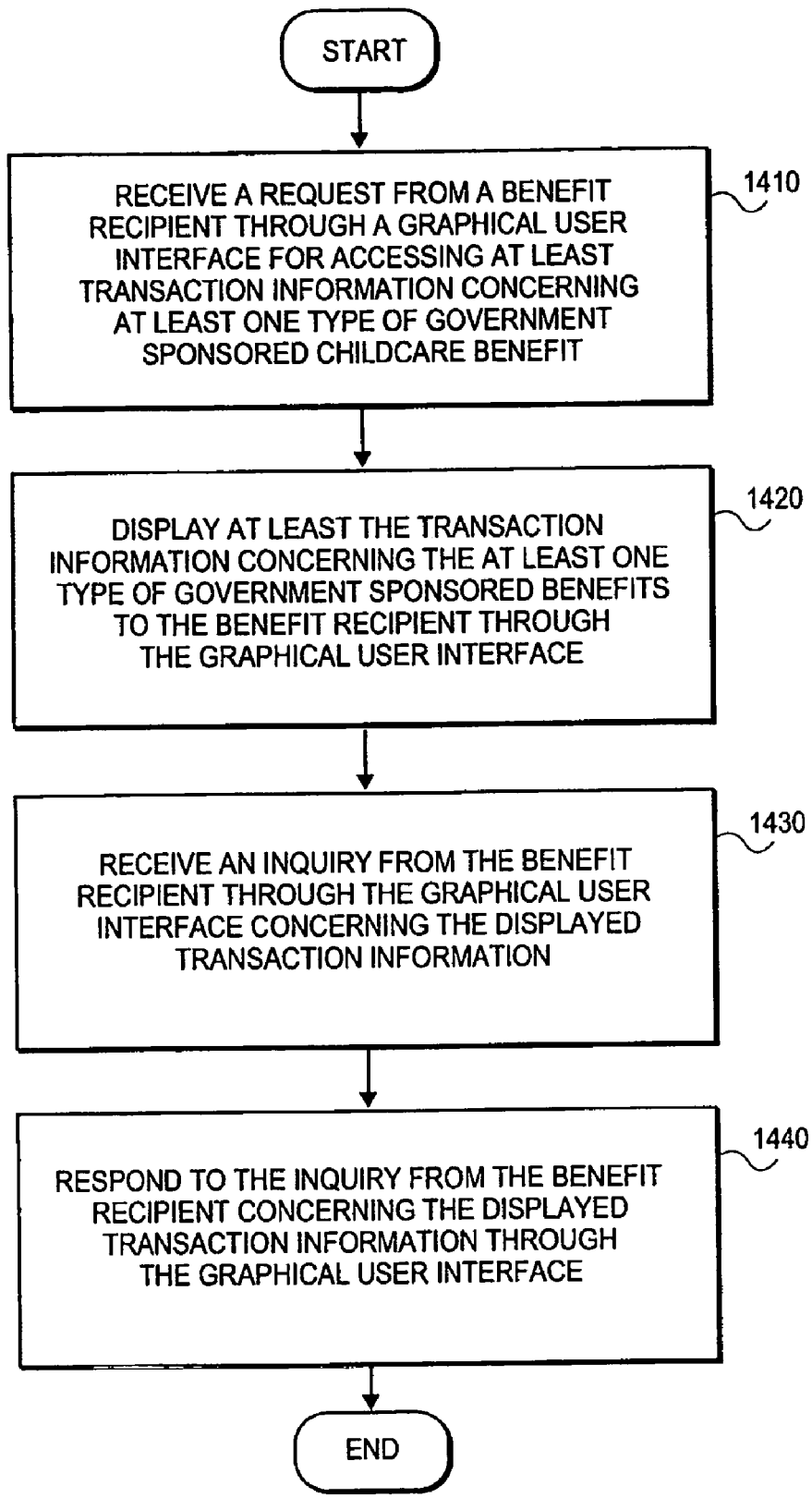
FIG. 14 shows a flow diagram illustrating another exemplary method for processing childcare benefits consistent with methods and systems of the present invention.

FIG. 14 depicts a flow chart for another exemplary method for processing childcare benefits. The method may include childcare processing system 200 receiving a request from a childcare customer 110 through a graphical user interface for accessing at least transaction information concerning at least one type of childcare benefits (step 1410). As discussed earlier, in some embodiments the graphical user interface may be a web browser.

Next, the childcare processing system may display the account transaction information concerning the at least one type of childcare benefits to the childcare customer 110 through the graphical user interface (step 1420). The childcare processing system may then receive an inquiry from the childcare customer 110 through the graphical user interface concerning the displayed account transaction information (step 1430).

The childcare processing system may then respond to the inquiry from the childcare customer 110 concerning the displayed account transaction information through the graphical user interface (step 1440). Although this response may be generated automatically by the childcare processing system, an operator may manually respond to the inquiry as well.

Figure 15:
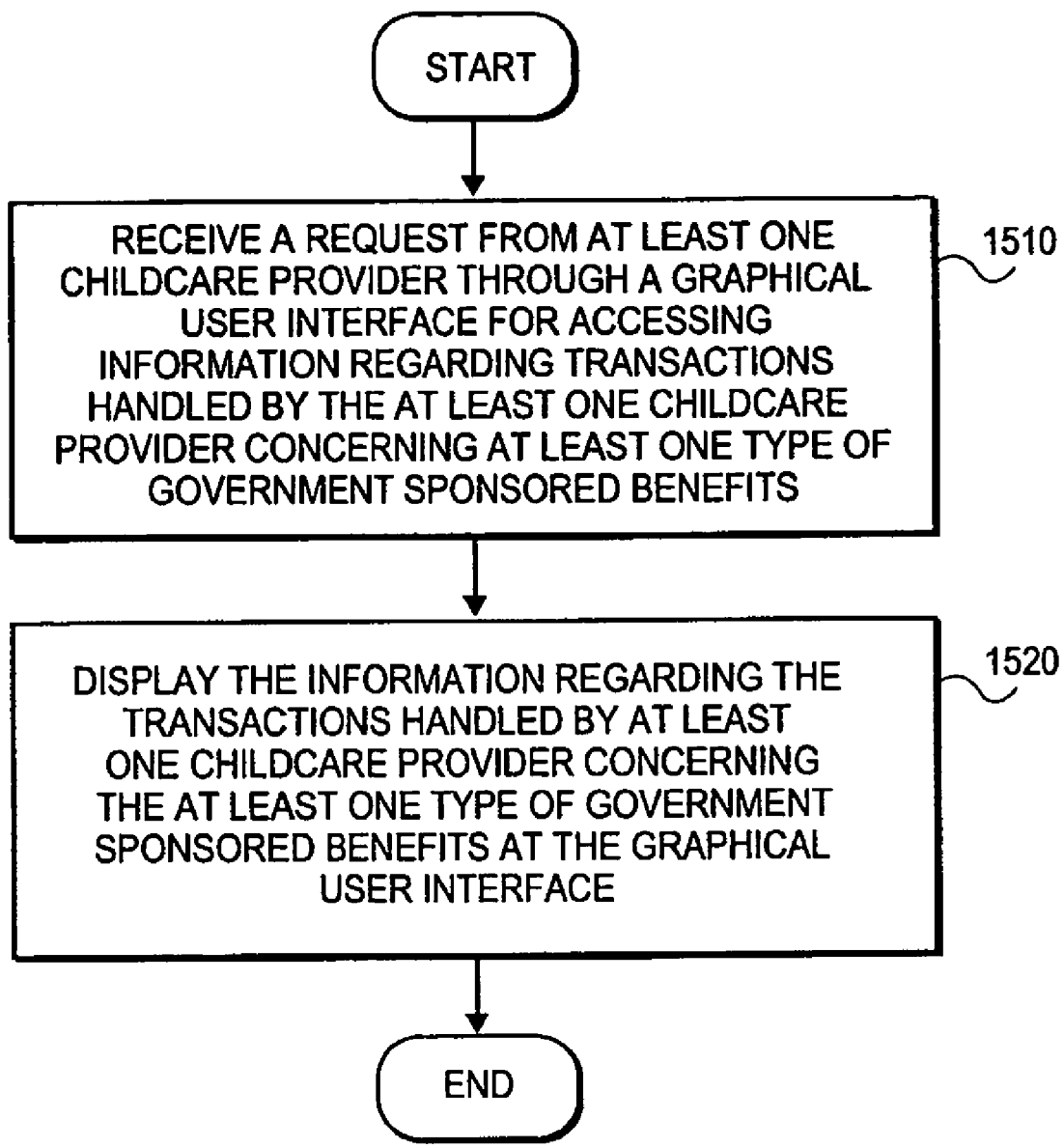
FIG. 15 shows a flow diagram illustrating an exemplary method for managing childcare benefits consistent with methods and systems of the present invention.

FIG. 15 shows a flow chart for an exemplary method for managing childcare benefits. The exemplary method may include the childcare processing system receiving a request from at least one childcare provider 140, in some embodiments made through a graphical user interface, for accessing information regarding transactions handled by the at least one childcare provider 140 concerning at least one type of childcare benefit (step 1510). Thus, as part of step 1510, a childcare provider 140 may access information regarding any transactions that were paid for using benefit card 120.

The method may further include displaying the information regarding the transactions handled by the at least one childcare provider 140 concerning the at least one type of childcare benefits at the graphical user interface (step 1520). In some embodiments, information regarding the transactions handled by the at least one childcare provider 140 may be displayed in a summary form. Additionally, detailed information regarding at least one transaction handled by the at least one childcare provider 140 concerning the at least one type of childcare benefits may be displayed. Further, an benefits administrator 130 or another authorized user may search information concerning the at least one childcare provider 140 through the graphical user interface. Further, information regarding transactions for a particular childcare provider 140, initiated either by childcare provider 140 or benefits administrator 130, may be transmitted to childcare provider 140.

Figure 16:
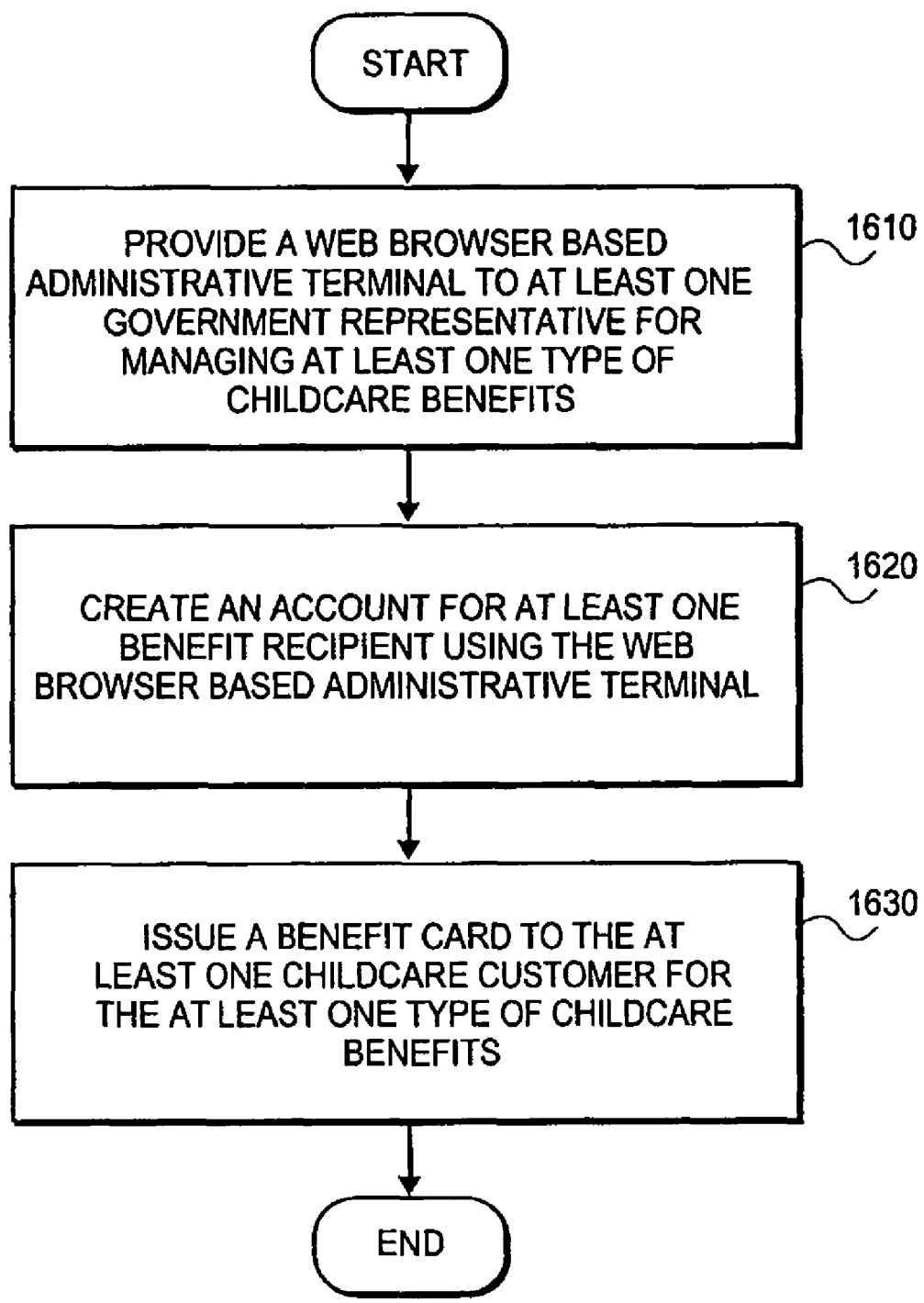
FIG. 16 shows a flow diagram illustrating another exemplary method for managing childcare benefits consistent with methods and systems of the present invention.

FIG. 16 shows a flow chart for an exemplary method for managing childcare benefits. Consistent with the exemplary method, a web browser based administrator terminal may be provided to at least one government representative, benefits administrator 130, for managing at least one type of childcare benefit (step 1610). The government representative may be a federal, state, or county employee or anyone else authorized to manage the at least one type of childcare benefits. The method may further include creating an account for at least one childcare customer 110 using the web browser based administrative terminal (step 1620). An administrator terminal may be similar to terminal 150, but may have further functionality associated with the duties of benefits administrator 130.

The method may further include issuing a benefit card to the at least one childcare customer 110 for the at least one type of childcare benefits (step 1630). The benefit card may be similar to a credit card, a smart card, or any other type of card and/or apparatus that may be used to access benefits-related information. Thus, for example, as shown in FIG. 10C, a new card may be issued. Further, the authorized user, for example, a county employee, may add at least one childcare provider 140 to the at least one type of childcare benefit. Alternatively, the authorized user may cancel at least one childcare provider 140 from the program.

Figure 17:
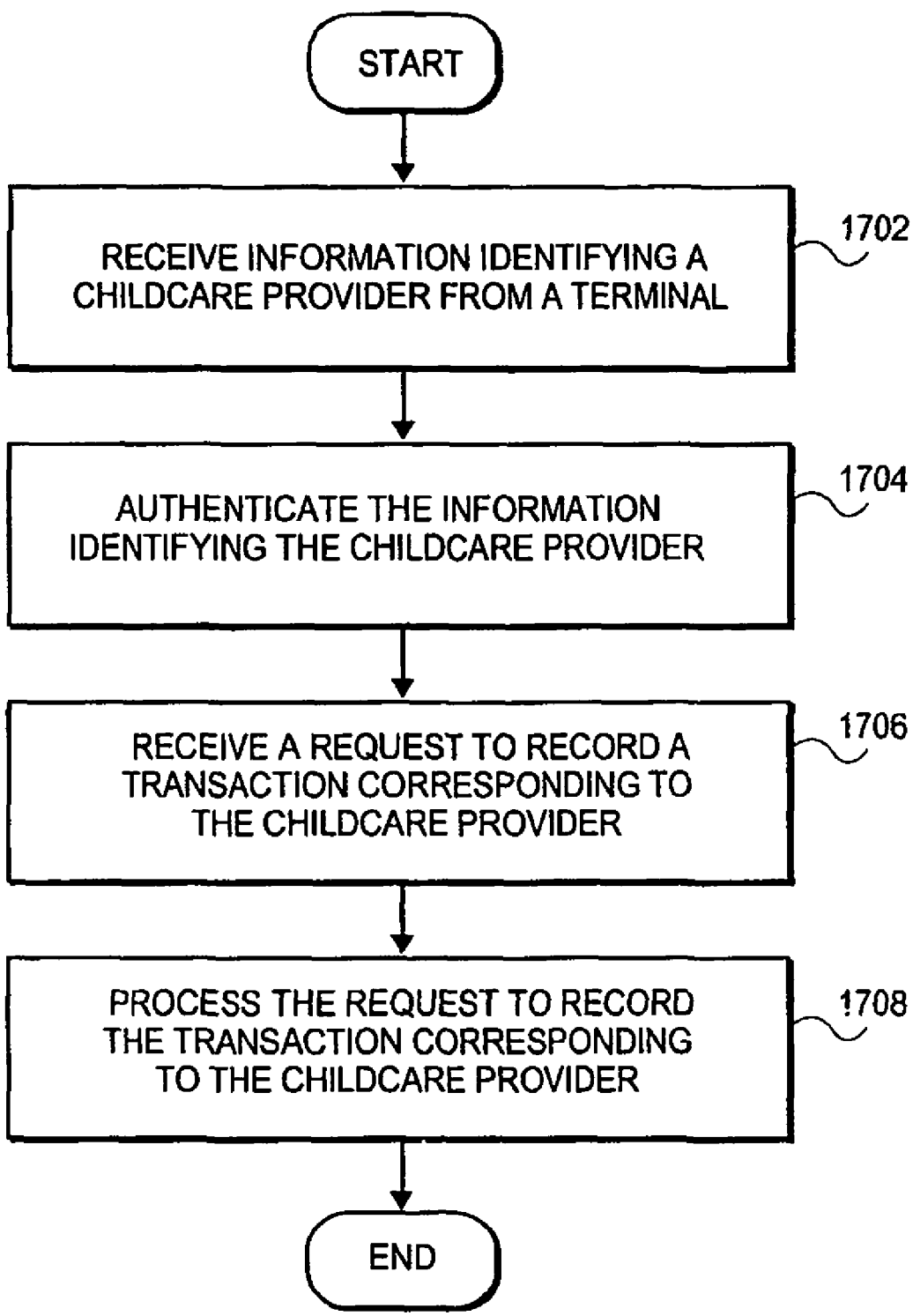
FIG. 17 shows a flow diagram illustrating a redundant arrangement for processing childcare benefits consistent with methods and systems of the present invention.

FIG. 17 shows a flow diagram illustrating an exemplary method for providing access to childcare benefits. The exemplary method may include receiving information identifying a childcare customer 110 from terminal 150 (step 1702). The childcare customer 110 may swipe a benefit card at terminal 150, thereby providing information coded on, for example, a magnetic strip.

Next, the information identifying the childcare customer 110 may be authenticated (step 1704). Authentication may include verifying the childcare customer 110's identity. It may further include determining the eligibility of the childcare customer 110 to receive a particular benefit.

The exemplary method, as shown in FIG. 17, may further include receiving a request to debit an account corresponding to the childcare customer 110 (step 1706). This information may be received before authenticating the information identifying the childcare customer 110. Thus, both the information identifying the childcare customer 110 and the request to debit the account may be received before authentication. Further, the exemplary method includes processing the request to debit the account corresponding to the childcare customer 110 (step 1708). This step may include debiting the account and recording the transaction for reporting purposes.

Figure 18:
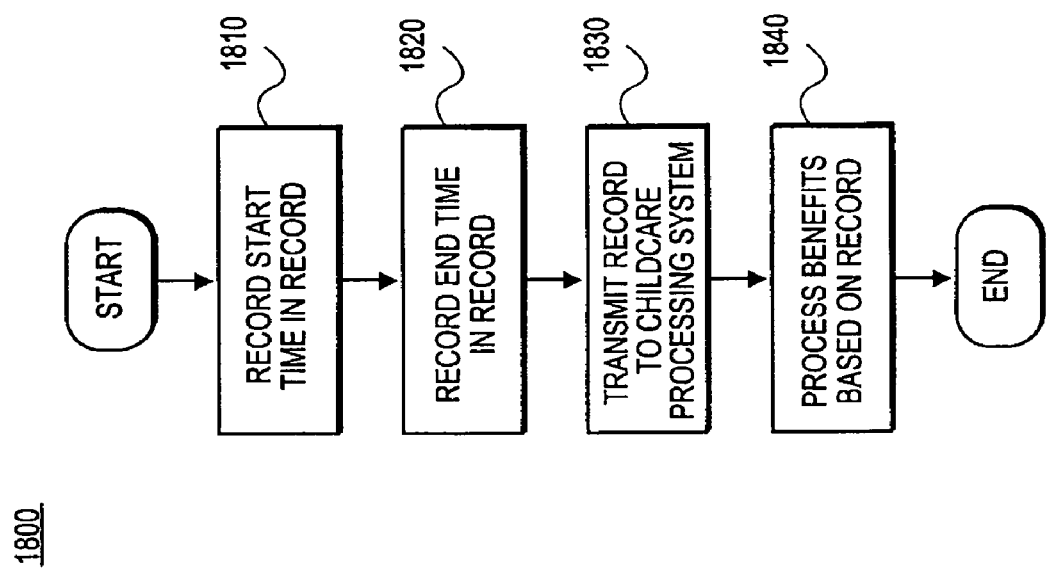
FIG. 18 shows a flow diagram illustrating an exemplary method for recording a childcare service transaction consistent with methods and systems of the present invention.

FIG. 18 is one exemplary flow diagram illustrating use of childcare services consistent with methods and systems of the present invention. A start time is recorded (step 1810). The start time may be recorded in response to a prompt on display 517 of terminal 150 to the childcare customer 110, requesting the entering of account information via one of card reader 513 or keypad 515. In some embodiments, once valid account information is entered, display 517 prompts childcare customer 110 to enter the transaction type. Display 517 presents to childcare customer 110 a plurality of transactions along with an assigned alphanumeric character. Childcare customer 110 may select a transaction by depressing one of buttons labeled with the corresponding assigned character. When childcare customer 110 selects the transaction, display 517 may prompt the client to enter additional information required to complete the transaction. For example, if childcare customer 110 selects the transaction for entering attendance information for a previous visit, then display 517 prompts childcare customer 110 to input a date and at least one of a start time or end time for the childcare services rendered during a previous visit.

Terminal 150 records an end time in step 1820. When a childcare customer 110 returns to childcare provider 140 at the end of the day, they may once again swipe the benefit card and with this action an end time is recorded. Terminal 150 may then processes the transaction information and calculate payment due to childcare provider 140. The transaction record 160, including the start time and the end time is transmitted to childcare processing system 200 (step 1830). Childcare processing system 200 enables benefits administrator 130 (which may represent a plurality of authorized users) to obtain transaction information to be processed by central computer 120 and associated with childcare provider 140.

Using record 160, benefits are processed by childcare processing system 200 (step 1840). The start time and end time can be used, along with childcare customer 110 attributes to determine payments to the childcare provider 140. Benefits administrator 130 may handle this processing. Benefits administrator 130 may also process payment data and transaction information for the purposes of auditing provider facilities, reconciling discrepancies in calculated payments, and processing payments.

Figure 19:
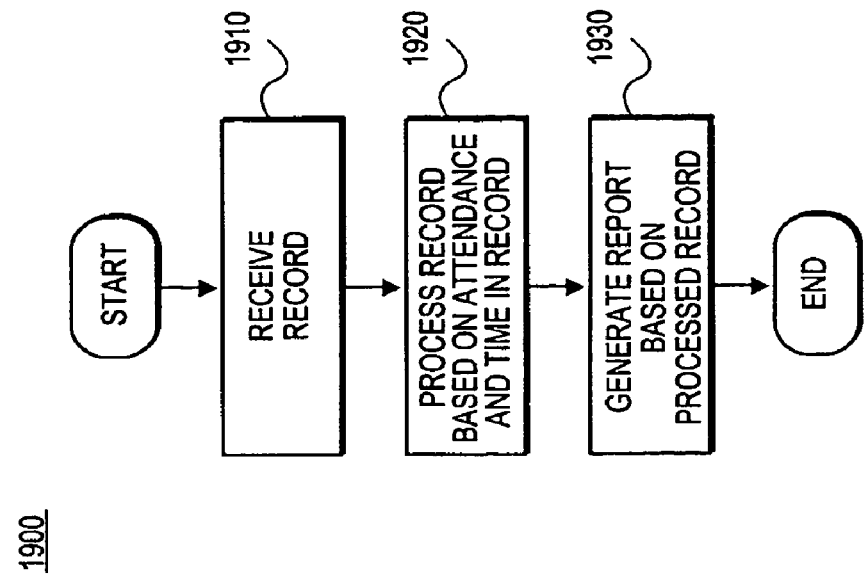
FIG. 19 shows a flow diagram illustrating an exemplary method for generating a report consistent with methods and systems of the present invention.

FIG. 19 is an exemplary flow diagram illustrating management of childcare services consistent with methods and systems of the present invention. Benefits administrators 130 may have a need for reports that audit childcare provider facilities 140, reconciling discrepancies in calculated payments, and processing payments. In order to manage childcare services a record or set of records 160 are received (step 1910). Record 160 is then processed so that at least a start time and end time of the childcare service are analyzed (step 1920). At this step, benefits administrator 130 may calculate payments for childcare provider 140, for example, based on the start time and end time of the childcare service. If the payment due identified in the record does not equal the calculated payment, then childcare provider 140 may be audited to identify the discrepancy, or reconciliation of the calculated payment so that the discrepancy is resolved. On the other hand, if the payment due equals the calculated payment, then benefit administrator may authorize an electronic transfer of funds from a financial institution to the account of childcare provider 140. A report is then generated based on the processed records (step 1930). This report can indicate the results of auditing or of successful payments to childcare provider 140.

Other embodiments of the invention will be apparent to those skilled in the art from consideration of the specification and practice of the invention disclosed herein. For example, although the various embodiments have been described by referring to childcare benefits, they are applicable for benefits sponsored by private entities and/or benefits sponsored by a combination of private and public funds. Accordingly, it is intended that the specification and examples be considered as exemplary only, with a true scope and spirit of the invention being indicated by the following claims.

What is claimed is:

1. A method for managing benefits, comprising:
providing a web browser based administrative terminal to at least one benefits administrator for managing at least one type of benefit;
creating an account for at least one customer using the web browser based administrative terminal;
issuing a benefit token to the at least one customer for at least one type of service;
receiving a transaction record, the transaction record including at least a start time, an end time, and an amount due for service at a service provider for the at least one customer;
calculating a benefits payment based on the start time, the end time, and the at least one type of benefit; and
determining, by a processor, if there is a discrepancy between the calculated benefits payment and the amount due;
auditing the service provider if there is a discrepancy between the calculated benefits payment and the amount due; and
providing the calculated benefits payment to the service provider based on the service if there is no discrepancy.

2. A method for managing childcare benefits, comprising:
providing a web browser based administrative terminal to at least one benefits administrator for managing at least one type of childcare benefit;
creating an account for at least one customer using the web browser based administrative terminal;
issuing a benefit token to the at least one customer for at least one type of childcare service;
receiving a transaction record, the transaction record including at least a start time, an end time, and an amount due for service at a childcare service provider for the at least one customer;
calculating a childcare benefits payment based on the start time, the end time, and the at least one type of childcare benefit;
determining, by a processor, if there is a discrepancy between the calculated childcare benefits payment and the amount due;
auditing the childcare service provider if there is a discrepancy between the calculated childcare benefits payment and the amount due; and
providing the calculated childcare benefits payment to the childcare service provider based on the service if there is no discrepancy.

3. The method of claim 2, further comprising: replacing at least one lost or stolen benefit token.

4. The method of claim 2, further comprising: issuing at least one code corresponding to the benefit token to the at least one customer.

5. The method of claim 2, further comprising: storing the transaction record regarding the account of the at least one customer for the at least one type of childcare benefit in at least one record log.

6. A system for managing benefits, comprising:
a providing component to provide a web browser based administrative terminal to at least one benefits administrator for managing at least one type of benefit;
a creating component to create an account for at least one customer using the web browser based administrative terminal;
a token issuing component to issue a benefit token to the at least one customer for at least one type of service;
a receiving component to receive a transaction record, the transaction record including at least a start time, an end time, and an amount due for service at a service provider for the at least one customer;
a calculating component to calculate a benefits payment based on the start time, the end time, and the at least one type of benefit;
determining if there is a discrepancy between the calculated benefits payment and the amount due;
an auditing component to audit the service provider if there is a discrepancy between the calculated benefits payment and the amount due; and
a payment component to provide the calculated benefits payment to the service provider based on the service if there is no discrepancy.

7. A system for managing childcare benefits, comprising:
a providing component to provide a web browser based administrative terminal to at least one benefits administrator for managing at least one type of childcare benefit;
a creating component to create an account for at least one customer using the web browser based administrative terminal;
a token issuing component to issue a benefit token to the at least one customer for at least one type of childcare service;
a receiving component to receive a transaction record, the transaction record including at least a start time, an end time, and an amount due for service at a childcare service provider for the at least one customer;
a calculating component to calculate a childcare benefit payment based on the start time, the end time, and the at least one type of childcare benefit;
determining if there is a discrepancy between the calculated childcare benefits payment and the amount due;
an auditing component to audit the childcare service provider if there is a discrepancy between the calculated childcare benefits payment and the amount due; and
a payment component to provide the calculated childcare benefits payment to the childcare service provider based on the service if there is no discrepancy.

8. The system of claim 7, further comprising:
a replacing component to replace at least one lost or stolen benefit token.

9. The system of claim 7, further comprising:
a code issuing component to issue at least one code corresponding to the benefit token to the at least one customer.

10. The system of claim 7, further comprising: a storing component to store the transaction record regarding the account for the at least one customer for the at least one type of childcare benefit in at least one record log.

11. A system for managing benefits, comprising:
means for providing a web browser based administrative terminal to at least one benefits administrator for managing at least one type of benefit;

means for creating an account for at least one customer using the web browser based administrative terminal;

means for issuing a benefit token to the at least one customer for at least one type of service;

means for receiving a transaction record, the transaction record including at least a start time, an end time, and an amount due for service at a service provider for the at least one customer;

means for calculating a benefits payment based on the start time, the end time, and the at least one type of benefit;

means for determining if there is a discrepancy between the calculated benefits payment and the amount due;

means for auditing the service provider if there is a discrepancy between the calculated benefits payment and the amount due; and means for providing the calculated benefits payment to the service provider based on the service if there is no discrepancy.

12. A system for managing childcare benefits, comprising:

means for providing a web browser based administrative terminal to at least one benefits administrator for managing at least one type of childcare benefit;

means for creating an account for at least one customer using the web browser based administrative terminal;

means for issuing a benefit token to the at least one customer for at least one type of childcare service;

means for receiving a transaction record, the transaction record including at least a start time, an end time, and an amount due for service at a childcare service provider for the at least one customer;

means for calculating a childcare benefit payment based on the start time, the end time, and the at least one type of childcare benefit;

means for determining if there is a discrepancy between the calculated childcare benefits payment and the amount due;

means for auditing the childcare service provider if there is a discrepancy between the calculated childcare benefits payment and the amount due; and means for providing the calculated childcare benefits payment to the childcare service provider based on the service if there is no discrepancy.

13. The system of claim 12 further comprising:
means for replacing at least one lost or stolen benefit token.

14. The system of claim 12 further comprising:
means for issuing at least one code corresponding to the benefit token to the at least one customer.

15. The system of claim 12 further comprising:
means for storing the transaction record regarding the account for the at least one customer for the at least one type of childcare benefit in at least one record log.

16. A tangible computer-readable medium containing instructions for controlling a data processing system to perform a method for managing benefits, the method comprising:

providing a web browser based administrative terminal to at least one benefits administrator for managing at least one type of benefit;

creating an account for at least one customer using the web browser based administrative terminal;

issuing a benefit token to the at least one customer for at least one type of service;

receiving a transaction record, the transaction record including at least a start time, an end time, and an amount due for service at a service provider for the at least one customer;

calculating a benefit payment based on the start time, the end time, and the at least one type of benefit;

determining if there is a discrepancy between the calculated benefit payment and the amount due;

auditing the service provider if there is a discrepancy between the calculated benefit payment and the amount due; and providing the calculated benefit payment to the service provider based on the service if there is no discrepancy.

17. A tangible computer-readable medium containing instructions for controlling a data processing system to perform a method for managing childcare benefits, the method comprising:

providing a web browser based administrative terminal to at least one benefits administrator for managing at least one type of childcare benefit;

creating an account for at least one customer using the web browser based administrative terminal;

issuing a benefit token to the at least one customer for at least one type of childcare service;

receiving a transaction record, the transaction record including at least a start time, an end time, and an amount due for service at a childcare service provider for the at least one customer;

calculating a childcare benefit payment based on the start time, the end time, and the at least one type of childcare benefit;

determining if there is a discrepancy between the calculated childcare benefit payment and the amount due;

auditing the childcare service provider if there is a discrepancy between the calculated childcare benefit payment and the amount due; and providing the calculated childcare benefit payment to the childcare service provider based on the service if there is no discrepancy.

18. The computer-readable medium of claim 17 further comprising:
replacing at least one lost or stolen benefit token.

19. The computer-readable medium of claim 17 further comprising:
issuing at least one code corresponding to the benefit token to the at least one customer.

20. The computer-readable medium of claim 17 further comprising:
storing the transaction record regarding the account for the at least one customer for the at least one type of childcare benefit in at least one record log.

21. A method for tracking and managing benefit services, comprising:

recording a start time and an end time of services provided at each for each service of a plurality of services at a time when each service is provided at a corresponding service provider of a plurality of service providers;

recording a transaction type for each provided service;

recording one or more customer attributes for each customer associated with each provided service;

recording an amount due for each provided service by the corresponding service provider;

computing a payment for each provided service based on at least the start time, the end time, the transaction type, and the one or more customer attributes;

determining, by a processor, if there is a discrepancy between the computed payment and the amount due for each provided service;

auditing the corresponding service provider if there is a discrepancy between the computed payment and the amount due;

making the computed payment to the corresponding service provider if there is no discrepancy; and generating a report based on the auditing if there is a discrepancy or based on the start time and the end time if there is no discrepancy.

22. A method for tracking and managing childcare benefit services, comprising:
recording a start time and an end time for each service of a plurality of services at a time when each service is provided at a corresponding childcare service provider of a plurality of childcare service providers;
recording a transaction type for each provided service;
recording one or more customer attributes for each customer associated with each provided service;
recording an amount due for each provided service by the corresponding childcare service provider;
computing a payment for each provided service based on at least the start time, the end time, the transaction type, and the one or more customer attributes;
determining, by a processor, if there is a discrepancy between the computed payment and the amount due for each provided service;
auditing the corresponding childcare service provider if there is a discrepancy between the computed payment and the amount due;
making the computed payment to the corresponding childcare service provider if there is no discrepancy; and
generating a report based on the auditing if there is a discrepancy, or based on the start time and the end time if there is no discrepancy.

23. The method of claim 22, wherein generating the report comprises:
generating at least one of a payment report, a data activity report, and an unusual activity report.

24. A system for tracking and managing services, comprising:
a recording component to record a start time and an end time for each service of a plurality of services at a time when each service is provided at a corresponding service provider of a plurality of service providers, record a transaction type for each provided service,
record one or more customer attributes for each customer associated with each provided service, and record an amount due for each provided service by the corresponding service provider;
a computing component to compute a payment for each provided service based on at least the start time, the end time, the transaction type, and the one or more customer attributes;
a determining component to determine if there is a discrepancy between the computed payment and the amount due for each provided service;
an auditing component to audit the corresponding service provider if there is a discrepancy between the computed payment and the amount due;
a payment component to make the computed payment to the corresponding service provider if there is no discrepancy; and
a report generating component to generate a report based on the auditing if there is a discrepancy, or based on the start time and the end time if there is no discrepancy.

25. A system for tracking and managing childcare services, comprising:
a recording component to record a start time and an end time for each service of a plurality of services at a time when each service is provided at a corresponding childcare service provider of a plurality of childcare service providers, record a transaction type for each provided service, record one or more customer attributes for each customer associated with each provided service, and record an amount due for each provided service by the corresponding childcare service provider;
a computing component to compute a payment for each provided service based on at least the start time, the end time, the transaction type, and the one or more customer attributes;
a determining component to determine if there is a discrepancy between the computed payment and the amount due for each provided service;
an auditing component to audit the corresponding childcare service provider if there is a discrepancy between the computed payment and the amount due;
a payment component to make the computed payment to the corresponding childcare service provider if there is no discrepancy; and
a report generating component to generate a report based on the auditing if there is a discrepancy, or based on the start time and the end time if there is no discrepancy.

26. The system of claim 25, wherein the report generating component comprises:
a payment report generating component for generating a payment report;
a data activity report component for generating a data activity report; and
an unusual activity report component for generating an unusual activity report.

27. A system for tracking and managing benefit services, comprising:
means for electronically recording a start time and an end time for each service of a plurality of services at a time when each service is provided at a corresponding service provider of a plurality of service providers;
means for electronically recording a transaction type for each provided service;
means for electronically recording one or more customer attributes for each customer associated with each provided service;
means for electronically recording an amount due for each provided service by the corresponding service provider;
means for computing a payment for each provided service based on at least the start time, the end time, the transaction type, and the one or more customer attributes;
means for determining if there is a discrepancy between the computed payment and the amount due for each provided service;
means for auditing the corresponding service provider if there is a discrepancy between the computed payment and the amount due;
means for making the computed payment to the corresponding service provider if there is no discrepancy; and
means for generating a report based on the auditing if there is a discrepancy, or based on the start time and the end time if there is no discrepancy.

28. A system for tracking and managing childcare benefit services, comprising:
means for electronically recording a start time and an end time for each service of a plurality of services at a time when each service is provided at a corresponding childcare service provider of a plurality of childcare service providers;
means for electronically recording a transaction type for each provided service;

means for electronically recording one or more customer attributes for each customer associated with each provided service;

means for electronically recording an amount due for each provided service by the corresponding childcare service provider;

means for computing a payment for each provided service based on at least the start time, the end time, the transaction type, and the one or more customer attributes;

means for determining if there is a discrepancy between the computed payment and the amount due for each provided service;

means for auditing the corresponding childcare service provider if there is a discrepancy between the computed payment and the amount due;

means for making the computed payment to the corresponding childcare service provider if there is no discrepancy; and means for generating a report based on the auditing if there is a discrepancy, or based on the start time and the end time if there is no discrepancy.

29. The system of claim 28, wherein the means for generating the report comprises:

means for generating at least one of a payment report, a data activity report, and an unusual activity report.

30. A tangible computer-readable medium containing instructions for controlling a data processing system to perform a method for tracking and managing benefit services, the method comprising:

electronically recording a start time and an end time for each service of a plurality of services at a time when each service is provided at a corresponding service provider of a plurality of service providers;

electronically recording a transaction type for each provided service;

electronically recording one or more customer attributes for each customer associated with each provided service;

electronically recording an amount due for each es provided service by the corresponding service provider;

computing a payment for each provided service based on at least the start time, the end time, the transaction type, and the one or more customer attributes;

determining if there is a discrepancy between the computed payment and the amount due for each provided service;

auditing the corresponding service provider if there is a discrepancy between the computed payment and the amount due;

making the computed payment to the corresponding service provider if there is no discrepancy; and generating a report based on the auditing if there is a discrepancy, or based on the start time and the end time if there is no discrepancy.

31. A tangible computer-readable medium containing instructions for controlling a data processing system to perform a method for tracking and managing childcare benefit services, the method comprising:

electronically recording a start time and an end time of service for each service of a plurality of services at a time when each service is provided at a corresponding childcare service provider of a plurality of childcare service providers;

electronically recording a transaction type for each provided service;

electronically recording one or more customer attributes for each customer associated with each provided service;

electronically recording an amount due for each provided service by the corresponding childcare service provider;

computing a payment for each provided service based on at least the start time, the end time, the transaction type, and the one or more customer attributes;

determining if there is a discrepancy between the computed payment and the amount due for each provided service;

auditing the corresponding childcare service provider if there is a discrepancy between the computed payment and the amount due;

making the computed payment to the corresponding childcare service provider if there is no discrepancy; and generating a report based on the auditing if there is a discrepancy, or based on the start time and the end time if there is no discrepancy.

32. The computer-readable medium of claim 31, wherein generating the report further comprises:

generating at least one of a payment report, a data activity report, and an unusual activity report.

* * * * *

UNITED STATES PATENT AND TRADEMARK OFFICE
CERTIFICATE OF CORRECTION

| | |
|---|---|
| PATENT NO. | : 7,865,437 B2 |
| APPLICATION NO. | : 12/826881 |
| DATED | : January 4, 2011 |
| INVENTOR(S) | : Irma Jean Neal et al. |

It is certified that error appears in the above-identified patent and that said Letters Patent is hereby corrected as shown below:

Claim 21, col. 22, line 51, delete "at each for each" should read -- for each --.

Claim 30, col. 25, lines 39-40, "each es pro-vided" should read -- each pro-vided --.

Signed and Sealed this
First Day of March, 2011

David J. Kappos
*Director of the United States Patent and Trademark Office*